United States Patent [19]

Springer et al.

[11] Patent Number: 4,873,320
[45] Date of Patent: Oct. 10, 1989

[54] WATER-SOLUBLE MONOAZO AND DISAZO DYES CONTAINING A FIBER-REACTIVE 2-CHLORO-4-(NITROPHENYLAMINO-ALKYLAMINO)-S-TRIAZIN-6-YLAMINO GROUPING WITH A FIBER-REACTIVE GROUP OF THE VINYLSULFONE SERIES AS A SUBSTITUENT IN THE NITROPHENYL MOIETY

[75] Inventors: Hartmut Springer, Königstein/Taunus; Manfred Kühn, Frankfurt am Main; Holger M. Büch, Hofheim am Taunus, all of Fed. Rep. of Germany

[73] Assignee: Hoechst Aktiengesellschaft, Frankfurt am Main, Fed. Rep. of Germany

[21] Appl. No.: 133,009

[22] Filed: Dec. 15, 1987

[30] Foreign Application Priority Data

Dec. 17, 1986 [DE] Fed. Rep. of Germany ....... 3643014

[51] Int. Cl.$^4$ .................. C09B 62/085; C09B 62/03; C09B 62/53; C09B 62/533
[52] U.S. Cl. ..................................... 534/632; 534/582; 534/598; 534/617; 534/618; 534/634; 534/635; 534/636; 534/637; 534/638; 534/642; 534/727
[58] Field of Search ............... 534/632, 635, 636, 637, 534/638, 617, 618, 642, 634

[56] References Cited

U.S. PATENT DOCUMENTS

| | | | |
|---|---|---|---|
| 4,703,111 | 10/1987 | Segal et al. | 534/637 |
| 4,725,674 | 2/1988 | Segal et al. | 534/657 |
| 4,731,441 | 3/1988 | Segal et al. | 534/637 |

FOREIGN PATENT DOCUMENTS

| | | | |
|---|---|---|---|
| 0014432 | 8/1980 | European Pat. Off. | 534/637 |
| 0040790 | 12/1981 | European Pat. Off. | 534/618 |
| 0133270 | 2/1985 | European Pat. Off. | 534/632 |
| 0159292 | 10/1985 | European Pat. Off. | 534/632 |
| 0196536 | 10/1986 | European Pat. Off. | 534/638 |
| 0212264 | 3/1987 | European Pat. Off. | 534/638 |
| 3327641 | 2/1985 | Fed. Rep. of Germany | 534/638 |
| 3526551 | 2/1987 | Fed. Rep. of Germany | 534/638 |

Primary Examiner—Floyd D. Higel

[57] ABSTRACT

Water-soluble dyes which contain one or two fiber-reactive groups of the formula

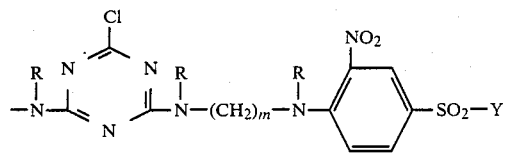

in which each R is a hydrogen atom or an alkyl group having 1 to 4 carbon atoms, it being possible for both R to have a meaning which is identical to or different from one another, Y is the vinyl group or a group of the general formula —CH$_2$—CH$_2$—X in which X represents a substituent which can be eliminated as an anion, and m represents the number 2 or 3. These novel dyes can be used to dye hydroxy and/or carboxamide group-containing materials in particular fiber-materials, such as, in particular, cellulose fiber materials, in fast shades.

16 Claims, No Drawings

WATER-SOLUBLE MONOAZO AND DISAZO DYES CONTAINING A FIBER-REACTIVE 2-CHLORO-4-(NITROPHENYLAMINO-ALKYLAMINO)-S-TRIAZIN-6-YLAMINO GROUPING WITH A FIBER-REACTIVE GROUP OF THE VINYLSULFONE SERIES AS A SUBSTITUENT IN THE NITROPHENYL MOIETY

The invention is in the industrial area of fiber-reactive dyes.

Fiber-reactive dyes are employed to a large extent for dyeing and printing textile fiber materials, and a large number of usable reactive dyes are available for various areas of application. However, the positon reached is not completely satisfactory since certain applicational problems exist, for example, inadequate suitability for certain dyeing methods and very temperature-dependent color yields, and also, in some cases, not completely satisfactory fastnesses, such as, in particular, inadequate wet fastness and perspiration light fastness. Consequently, there continues to be a demand for novel reactive dyes having improved properties; it has not been possible to satisfy this demand even by means of dyes which contain a 4-[4'-($\beta$-sulfatoethylsulfonyl)-benzylamino]-2-chloro-s-triazin-6-ylamino group as the fiber-reactive radical and which have recently been disclosed in German Offenlegungsschrift 3,327,641.

The present invention therefore had the object of finding novel fiber-reactive dyes which have improved properties and which dye textile fibers, such as, in particular, cotton, in all color shades and are distinguished, above all, by a stable fiber-dye bond and a high degree of fixing, and which are suitable, in particular, for dyeing by the exhaust method in a broad temperature range, and are likewise suitable for printing; in addition, proportions of these dyes which do not fix to the fibers should be easy to wash out, and the dyeings and prints obtainable using them should have good use fastnesses, in particular good light and wet light fastnesses, such as alkaline perspiration light fastnesses.

This object was achieved by means of the present invention through the discovery of the compounds of the general formula (1).

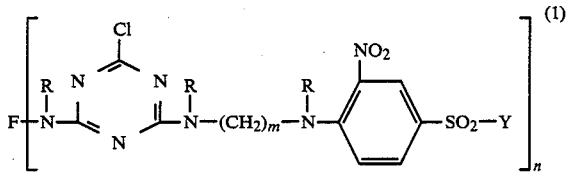

In this formula:
F denotes a radical of a dye, preferably a water-soluble sulfo group-containing dye and preferably from the azo series, from this in particular the radical of a sulfo group-containing monoazo or disazo dye;
m denotes the number 2 or 3, preferably 2;
n denotes the number 1 or 2, preferably 1;
R denotes a hydrogen atom or an alkyl group having 1 to 4 carbon atoms; and
Y denotes the vinyl group or a group of the general formula (2)

in which X represents a substituent which can be eliminated as an anion, in particular by means of an alkali.

Preferred dyes of the general formula (1) are those which have a total of 1 to 6 sulfo groups. Furthermore, the dye radicals F can contain further conventional fiberreactive groups.

Dyes containing the radical F or the dyes containing an amino group —NHR which are based on the compounds of the general formula (1) are described in large number in the literature, thus, for example, in European Patent Applications 0,070,806 A, 0,070,808 A and 0,076,782 A, and in German Auslegeschrift 2,614,550, furthermore in Venkataraman, The Chemistry of Synthetic Dyes, New York, London, 1972, volume VI, pages 213–297. Particularly valuable dyes of this series are water-soluble azo dyes, in particular those which contain sulfo and/or carboxy groups, in particular sulfo group-containing monoazo and disazo dyes.

In formula (1), the radicals R can have identical or different meanings. Alkyl groups R are, for example, the n-butyl, n-propyl and the ethyl group, preferably the methyl group. R is preferably a hydrogen atom.

The following should be mentioned as examples of substituents X which can be eliminated as the anion: chlorine, sulfato, thiosulfato, phosphato, alkylsulfonyloxy having 1 to 4 carbon atoms such as methylsulfonyloxy, alkanoyloxy having 2 to 5 carbon atoms, such as acetyloxy, and sulfobenzoyloxy; of these, sulfato and phosphato, in particular sulfato, are preferred.

Sulfo, carboxy, sulfato, thiosulfato and phosphato groups are groups of the general formula —$SO_3M$, —$COOM$, —$OSO_3M$, —$S$—$SO_3M$ and —$OPO_3M_2$ respectively, in which M represents a hydrogen atom or an alkali metal, such as sodium, potassium or lithium.

The important azo dyes corresponding to the general formula (1) are those in which F denotes a radical of a dye from the benzene-azo-naphthol, benzene-azo-1-phenyl-5-pyrazolone, benzene-azo-benzene, naphthalene-azo-benzene, benzene-azo-aminonaphthalene, naphthalene-azo-naphthalene, naphthalene-azo-1-phenyl-5-pyrazolone, benzene-azo-pyridone and naphthalene-azo-pyridone series, the sulfo group-containing dyes also being preferred here.

The present invention thus relates, in particular, to water-soluble, sulfo group-containing azo dyes which contain one or two fiber-reactive groups Z of the general formula (3)

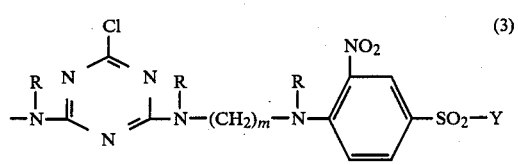

in which R, m and Y have the abovementioned meanings.

Such azo dyes of the general formula (1) are, in particular, dyes of the general formula (4)

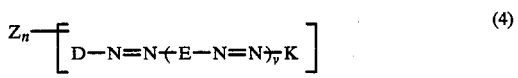

in which D represents the radical of a diazo component, E represents the divalent radical of a compound which is capable of coupling and can be diazotized, K represents the radical of a coupling component, and v represents the number zero or 1, and Z denotes a radical of the general formula (3) and n is the number 1 or 2, preferably 1, and the radical Z is bonded to the radical D or to the radical K or, in the case where n=2, to each of D and K.

Diazo components D—NH$_2$ of the aniline and aminonaphthalene series which do not carry a fiber-reactive group Z are, for example, amines of the general formula (5a) or (5b)

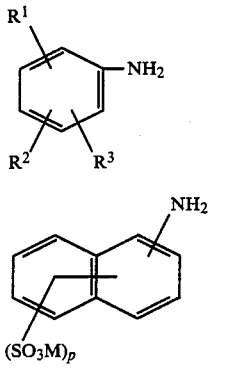

in which
R$^1$ is hydrogen, methyl, ethyl, methoxy, ethoxy, alkanoyl having 2 to 5 carbon atoms, such as acetyl and propionyl, cyano, carboxy, sulfo, alkoxycarbonyl having 2 to 5 carbon atoms, carbamoyl, N-(C$_1$-C$_4$-alkyl)-carbamoyl, fluorine, chlorine, bromine or trifluoromethyl,
R$^2$ is hydrogen, methyl, ethyl, methoxy, ethoxy, cyano, carboxy, sulfo, alkanoylamino having 2 to 5 carbon atoms, of which in particular acetylamino, alkoxycarbonyl having 2 to 5 carbon atoms, carbamoyl, N-(C$_1$-C$_4$-alkyl)-carbamoyl, fluorine, chlorine, nitro, sulfamoyl, N-(C$_1$-C$_4$-alkyl)-sulfamoyl, alkylsulfonyl having 1 to 4 carbon atoms, phenylsulfonyl or phenoxy,
R$^3$ is a hydrogen atom, a sulfo group or a β-sulfatoethylsulfonyl or vinylsulfonyl group,
p denotes the number zero, 1, 2 or 3 (this group denoting a hydrogen atom in the case where p equals zero), and
M has the abovementioned meaning.

Of these, R$^1$ is preferably equal to hydrogen, methyl, methoxy, bromine, chlorine, carboxy, and sulfo, and R$^2$ is preferably equal to hydrogen, methyl, methoxy, chlorine, carboxy, sulfo and acetylamino.

Aromatic amines of the general formula D—NH$_2$, such as those of the formulae (5a) and (5b), are, for example: aniline, 2-methoxyaniline, 2-ethoxyaniline, 2-methylaniline, 4-nitro-2-aminoanisole, 4-chloro-2-aminoanisole, 4-methylaniline, 4-methoxyaniline, 2-nitro-4-aminoanisole, 2-methoxy-5-methylaniline, 4-nitroaniline, 2-nitro-4-methylaniline, 2,5-dimethoxyaniline, 2,5-dimethylaniline, 2,4-dimethylaniline, 4-butylaniline, 2,5-diethoxyaniline, 4-cyanoaniline, 2-chloroaniline, 3-chloroaniline, 4-chloroaniline, 4-chloro-2-methylaniline, 3-chloro-2-methylaniline, 4-chloro-2-aminotoluene, 4-(p-tolylsulfonyl)-aniline, 1-naphthylamine, 2-naphthylamine, 4-benzoylamino-2-ethoxyaniline, 3-amino-4-methylbenzonitrile, 4-methylsulfonylaniline, 2-trifluoromethylaniline, 3-trifluoromethyl-4-chloroaniline, 2-amino- or 4-aminobenzoic acid,
3-aminobenzoic acid, 3-chloroaniline-6-carboxylic acid, aniline-2- or -3- or -4-sulfonic acid, 2,5-disulfoaniline, 2,4-disulfoaniline, 3,5-disulfoaniline, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 3-acetylamino-6-sulfoaniline, 4-acetylamino-2-sulfoaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid and 4-(β-sulfatoethylsulfonyl)-aniline.

Aromatic amines of the diazo component Z-D-NH$_2$ from the aniline and aminonaphthalene series containing the fiber-reactive radical Z originate from aromatic amines of the general formula (6a) or (6b)

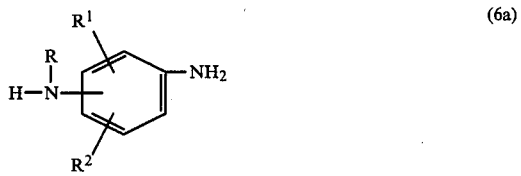

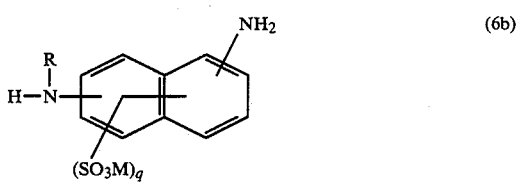

in which
R, R$^1$ and R$^2$ have the abovementioned, particularly preferred meanings, and
q represents the number zero, 1 or 2 (this group denoting a hydrogen atom in the case where q equals zero).

Amines of the general formulae (6) are, for example: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, 1,3-diaminobenzene-5-sulfonic acid, 1,3-diamino-5-methylbenzene, 1,5-diaminonaphthalene, 8-sulfo-1,3- diaminonaphthalene and 4,8-disulfo-1,6-diaminonaphthalene.

Aromatic radicals E of a compound from the aniline and aminonaphthalene series which is capable of coupling and can be diazotized, are derived, for example, from amines of the general formulae (7a) and (7b)

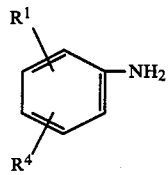
(7a)

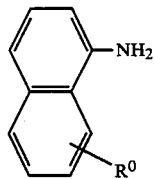
(7b)

in which
$R^1$ and M have the abovementioned meanings,
$R^o$ is a hydrogen atom or a sulfo group,
$R^4$ is a hydrogen atom, an alkyl group having 1 to 4 carbon atoms, such as the methyl or ethyl group, an alkoxy group having 1 to 4 carbon atoms, such as the methoxy and ethoxy group, a chlorine atom, an alkanoylamino group having 2 to 5 carbon atoms, such as the acetylamino and propionylamino group, the benzoylamino group, the ureido group, a phenylureido group, an alkylureido group having 1 to 4 carbon atoms in the alkyl radical, a phenylsulfonyl group, a cycloalkylureido group having 5 to 8 carbon atoms in the cycloalkyl part, an alkylsulfonyl group having 1 to 4 carbon atoms or an alkylsulfonylamino group having 1 to 4 carbon atoms.

Such compounds are, for example: aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylaminoaniline, 2,3-dimethylaniline, 3,5-dimethylaniline, 1-amino-2-methoxy-5-acetylaminobenzene, 2-chloro-6-methylaniline, 5-chloro-2-methylaniline, 2,6-dichloro-3-methylaniline and 2-methoxy-5-methylaniline.

The radicals K of the coupling component preferably originate from the aniline, naphthalene, pyridone, pyrazole and acylacetarylide series; they can possess fiber-reactive groups. Coupling components of the formula H-K from the aniline and naphthalene series are, for example, the anilines, N-monosubstituted and N,N-disubstituted anilines, m-phenylenediamines and derivatives thereof, naphtholsulfonic acids, aminonaphthalene, naphthols, hydroxynaphthoic acid derivatives, aminonaphthalenesulfonic acids or aminonaphtholsulfonic acids.

Coupling components of the formula H-K from the aniline and naphthalene series which do not carry a fiber-reactive group are, for example, compounds of the general formulae (8a), (8b) and (8c)

(8a)

(8b)

(8c)

in which
$R^5$ denotes alkylureido containing alkyl groups having 1 to 6, preferably 1 to 3, carbon atoms, phenylureido, phenylureido which is substituted in the phenyl radical by chlorine, methyl, methoxy, nitro, sulfo and/or carboxy, cycloalkylureido containing a cycloalkyl having 5 to 8 carbon atoms, such as cyclohexylureido, alkanoylamino having 2 to 7 carbon atoms, such as, for example, acetylamino and propionylamino, cyclohexanoylamino, benzoylamino, or benzoylamino which is substituted in the benzene radical by chlorine, methyl, methoxy, nitro, sulfo and/or carboxy,
$R^6$ is hydrogen, alkyl having 1 to 4 carbon atoms, such as methyl and ethyl, alkoxy having 1 to 4 carbon atoms, such as methoxy and ethoxy, bromine, chlorine or alkanoylamino having 2 to 7 carbon atoms, such as acetylamino and propionylamino,
$R^7$ is hydrogen, alkyl having 1 to 4 carbon atoms, such as methyl and ethyl, alkoxy having 1 to 4 carbon atoms, such as methoxy and ethoxy, chlorine, alkanoylamino having 2 to 7 carbon atoms, such as acetylamino and propionylamino, alkylsulfonylamino having 1 to 4 carbon atoms, such as methylsulfonylamino, ureido, cyclohexylureido or phenylureido,
$R^8$ is hydrogen, or alkyl which has 1 to 4 carbon atoms and which may be substituted by hydroxy, cyano, carboxyl, sulfo, sulfato, methoxycarbonyl, ethoxycarbonyl or acetoxy,
$R^9$ represents alkyl which has 1 to 4 carbon atoms and which may be substituted by hydroxy, cyano, carboxy, sulfo, sulfato, methoxycarbonyl, ethoxycarbonyl or acetoxy, or is benzyl or phenyl or phenyl which is substituted by alkyl having 1 to 4 carbon atoms, alkoxy having 1 to 4 carbon atoms, chlorine and/or sulfo.

Compounds of the general formulae (8) are, for example: 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid or 2-(3'- and 4'-sulfophenyl)-amino-8-hydroxynaphthalene-6-sulfonic acid, and N,N-di-(sulfoethyl)-aniline, N-ethyl-N-sulfoethylaniline, N-sulfoethylaniline and N-(β-carboxyethyl)aniline and derivatives thereof which are monosubstituted or disubstituted in the benzene nucleus by methyl, methoxy and/or ethoxy.

Of particular importance are sulfo group-containing, optionally azo group-carrying, such as 1 or 2 azo groups, coupling components which couple in the o- or p-position to a hydroxy and/or amino group, such as, for example, 2-acetylamino-5-hydroxynaphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid or 1-benzoylamino-8-hydroxynaphthalene-4,6-disulfonic acid.

In addition, the following should be mentioned particularly as coupling components H-K: 1-amino-8-hydroxynaphthalene-3,6- and -4,6-disulfonic acid and the arylazocoupling products thereof, obtained through acid coupling, of the formula (9a)

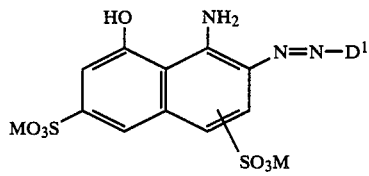

(9a)

in which $D^1$ may be the radical of a diazo component, for example a radical of the formula (10a) or (10b)

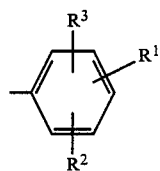

(10a)

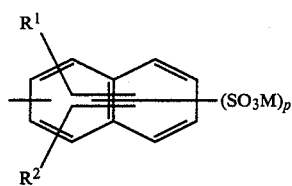

(10b)

in which $R^1$, $R^2$, $R^3$, M and p have the abovementioned particularly preferred meanings.

Individual radicals $D^1$ are derived, for example, from the following amines: aniline, aniline-2-, -3- and -4-sulfonic acid, aniline-2,4-, -2,5- and -3,5-disulfonic acid, 2-naphthylamine-1,5-and -4,8-disulfonic acid, 2-naphthylamine-3,6,8- and -4,6,8-trisulfonic acid, 1-naphthylamine-3,6,8- and -4,6,8-trisulfonic acid, 1-naphthylamine-4-sulfonic acid, 2-naphthylamine-1-sulfonic acid, 3- and 4-aminoacetanilide, 4-and 5-acetamido-2-sulfoaniline, 4-nitroaniline, 4-nitroaniline-2-sulfonic acid, 2-amino-6-acetaminonaphthalene-4,8-disulfonic acid and 4-(β-sulfatoethylsulfonyl)-aniline.

Further coupling components H-K which are free of the fiber-reactive group Z are, for example, those of the general formulae (11a), (11b), (11c) and (11d)

(11a)

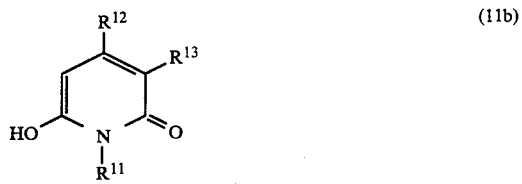

(11b)

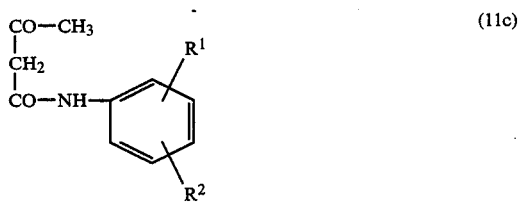

(11c)

or

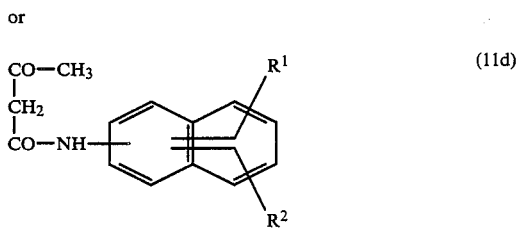

(11d)

in which

T represents a benzene or naphthalene nucleus, $R^{10}$ is methyl, carboxy, methoxycarbonyl or ethoxycarbonyl or a phenyl radical, $R^{11}$ represents a hydrogen atom, a $C_1$- to $C_4$-alkyl group which may be substituted by phenyl or sulfophenyl, a $C_1$- to $C_4$-alkyl group which is substituted by hydroxy, amino, methoxy, ethoxy, carboxy, sulfo, sulfato, phosphato, methylsulfonyl, ethylsulfonyl, phenylsulfonyl, acetylamino, benzoylamino or cyano, a cyclohexyl group, the phenyl group or a phenyl group which is substituted by carboxy, sulfo, benzoylamino, acetylamino, methyl, methoxy, cyano or chlorine, $R^{12}$ is $C_1$- to $C_4$-alkyl or phenyl, $R^{13}$ denotes hydrogen, chlorine, bromine, sulfo, carbamoyl, methylsulfonyl, phenylsulfonyl, cyano or sulfomethyl, and $R^1$, $R^2$, $R^3$ and M have the abovementioned particularly preferred meanings.

Pyrazolone coupling components are, for example, 3-methyl-, 3-carboxy- and 3-alkoxycarbonyl-5-pyrazolones, which carry a hydrogen or phenyl which is optionally substituted by methyl, ethyl, fluorine, chlorine, bromine, trifluoromethyl, methoxy, ethoxy, cyano, phenoxy, phenylsulfonyl, methylsulfonyl, sulfo, benzoyl, acetyl, acetylamino, nitro, hydroxy, carboxy, carbamoyl or sulfamoyl, or a sulfosubstituted 1- or 2-naphthyl in the 1-position, for example: 1-phenyl-, 1-(2'-chlorophenyl)-, 1-(2'-methoxyphenyl)-, 1-(2'-methylphenyl)-, 1-(2',5'-dichlorophenyl)-, 1-(2',6'-dichlorophenyl)-, 1-(2'-methyl-6'-chlorophenyl)-, 1-(2'-methoxy-5'-methylphenyl)-, 1-(2'-chloro-5'-sulfophenyl)-, 1-(2'-methoxy-5'-sulfophenyl)-, 1-(2'-methyl-4'-sulfophenyl)-, 1-(2',5'-dichloro-4'-sulfophenyl)-, 1-(2',5'-disulfophenyl)-, 1-(2'-carboxyphenyl)-, 1-(3'-sulfophenyl)-, 1-(4'-sulfophenyl)- and 1-(3'-sulfamoylphenyl)-3-carboxy-5-pyrazolone, 1-(3'- or 4'-sulfophenyl)-, 1-(2'-chlorophenyl)-, 1-(2'-chloro-4'- or -5'-sulfophenyl)-, 1-(2'-methyl-4'-sulfophenyl)-, 1-(2',5'-dichlorophenyl)-, 1-(4',8'-disulfo-8-naphthyl)- and 1-(6'-sulfo-1-naphthyl)-3-methyl-5-pyrazolone, ethyl 1-phenyl-5-pyrazolone-3-carboxylate, ethyl 5-pyrazolone-3-carboxylate or 5-pyrazolone-3-carboxylic acid.

Other coupling components originating from the pyrazole series are, for example, 1-methyl-, 1-ethyl-, 1-propyl-, 1-butyl-, 1-cyclohexyl-, 1-benzyl- or 1-phenyl-5-aminopyrazole, 1-(4'-chlorophenyl)- or 1-(4'-methylphenyl)-5-aminopyrazole or 1-phenyl-3-methyl-5-aminopyrazole. Pyridone coupling components are, for example: 1-ethyl-2-hydroxy-4-methyl-5-carboxamido-6-pyridone, 1-(2'-hydroxyethyl)-2-hydroxy-4-methyl-5-carboxamido-6-pyridone, 1-phenyl-2-hydroxy-4-methyl-5-carboxamido-6-pyridone, 1-ethyl-2-hydroxy-4-methyl-5-cyano-6-pyridone, 1-ethyl-2-hydroxy-4-sulfomethyl-5-carboxamido-6-pyridone, 1-ethyl-2-hydroxy-4-methyl-5-sulfomethyl-6-pyridone, 1-methyl-2-hydroxy-4-methyl-5-cyano-6-pyridone, 1-methyl-2-hydroxy-5-acetyl-6-pyridone, 1,4-dimethyl-2-hydroxy-5-cyano-6-pyridone, N-(β-sulfoethyl)-4-methyl-5-cyano- or -5-sulfomethyl- or -5-sulfo- or -5-carbamoyl-6-hydroxy-2-pyridone, N-(β-sulfatoethyl)-4-methyl-5-cyano- or -5-sulfomethyl-or -5-sulfo- or -5-carbamoyl-6-hydroxy-2-pyridone, N-(β-phosphatoethyl)-, N-(β-sulfoethyl)- and N-(β-sulfatoethyl)-4-methyl-6-hydroxy-2-pyridone, 1,4-dimethyl-2-hydroxy-5-carboxamido-6-pyridone, 2,6-dihydroxy-4-ethyl-5-cyanopyridine, 2,6-dihydroxy-4-ethyl-5-carboxamidopyridine, 1-ethyl-2-hydroxy-4-methyl-5-sulfomethyl-6-pyridone, 1-methyl-2-hydroxy-4-methyl-5-methylsulfonyl-6-pyridone or 1-carboxymethyl-2-hydroxy-4-ethyl-5-phenylsulfonyl-6-pyridone.

Coupling components from the aniline and naphthalene series which contain fiber-reactive groups are derived, for example, from compounds of the general formula (11e) to (11g)

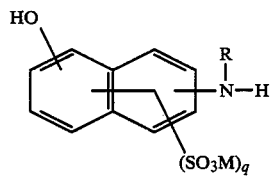
(11e)

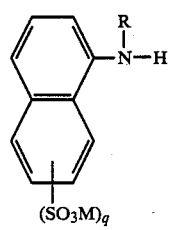
(11f)

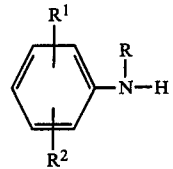
(11g)

in which R, $R^1$, $R^2$, M and q have the abovementioned, particularly preferred meanings.

Through reaction with a fiber-reactive acylating agent before coupling with the diazonium salt, with respect to the compounds of the general formula (11e) or after coupling with the diazonium salt, with respect to compounds of the general formulae (11e) to (11g), a fiber-reactive radical can be introduced. In principle, all known fiber-reactive acylating agents are possible for this, such as, in particular, 2,4-dichloro-6-(β-sulfatoethylsulfonylphenyl)-amino-s-triazine, 2,4-dichloro-6-bis-[β-(β'chloroethylsulfonyl)-ethyl]-amino-s-triazine and 3-(β-chloroethylsulfonyl)-benzoyl chloride, but in particular a dichlorotriazinylamino-s-triazine compound of the general formula (19) below.

Further coupling components H-K-Z are the arylazo coupling products, obtainable by acid coupling, of the 1-amino-8-hydroxynaphthalene-3,6- and -4,6-disulfonic acid of the general formula (9b)

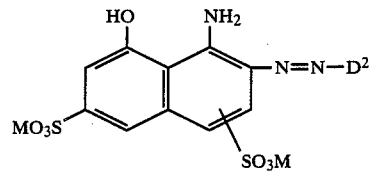
(9b)

in which $D^2$ is the radical of a diazo component containing a fiber-reactive group, in particular of the formula (3). The radical $D^2$ is, for example, a radical of the formula (12)

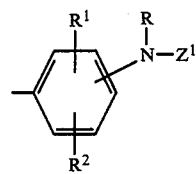
(12)

in which
R, $R^1$ and $R^2$ have the abovementioned meaning and $Z^1$ is a radical of the general formula (3a)

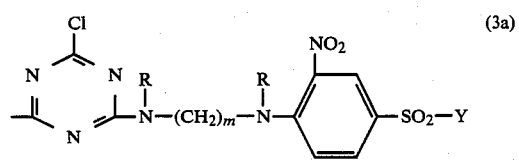
(3a)

where m, R and Y have the abovementioned meaning.

Aromatic diamines from the radical of the formula (12) are, for example: 1,3-diaminobenzene, 1,3-diaminobenzene-4-sulfonic acid, 1,3-diaminobenzene-4,6-disulfonic acid, 1,4-diaminobenzene, 1,4-diaminobenzene-2- sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid and 1,5-diamino-4-methoxybenzene-2-sulfonic acid, one primary or secondary amino group in all these diamino compounds being substituted by the fiber-reactive radical $Z^1$.

Preferred radicals $D^2$ of the formula (10) are, for example, the radicals of the formulae (12a), (12b), (12c), (12d) and (12e) where M has the abovementioned meaning:

sulfophenyl, 4-β-sulfatoethylsulfonylphenyl, 3-β-sulfatoethylsulfonylphenyl and 4-vinylsulfonylphenyl.

Coupling components which contain, according to the invention, the fiber-reactive group of the formula (3a) are, for example, compounds of the general formula (13a), (13b) and (13c), or their $Z^1$-free precursors:

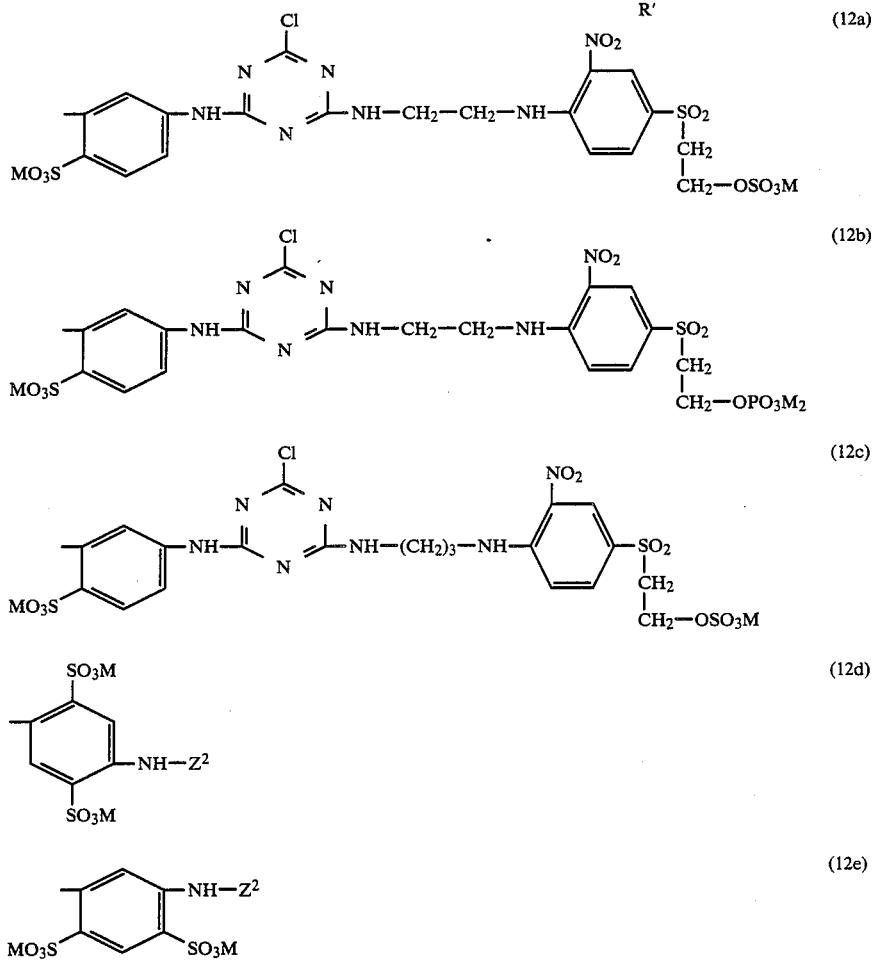

in which $Z^2$ is a radical of the formula (3b)

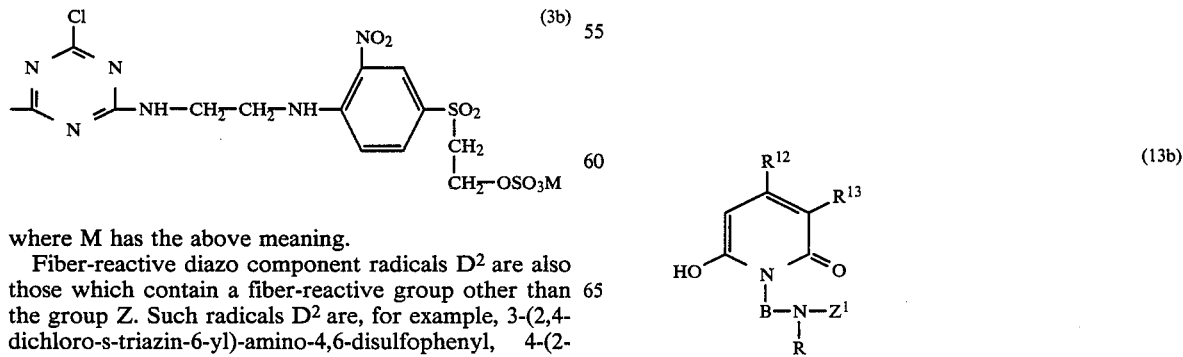

where M has the above meaning.

Fiber-reactive diazo component radicals $D^2$ are also those which contain a fiber-reactive group other than the group Z. Such radicals $D^2$ are, for example, 3-(2,4-dichloro-s-triazin-6-yl)-amino-4,6-disulfophenyl, 4-(2-m-sulfophenylamino-4-chloro-s-triazin-6-yl)-amino-2-

-continued

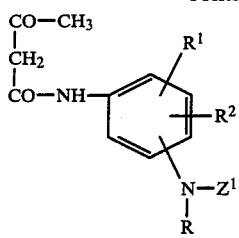
(13c)

in which
R$^1$, R$^2$, R, R$^{12}$, R$^{13}$, M, Z$^1$ and q have the above-mentioned meanings, and
T$^2$ denotes a benzene or naphthalene ring,
R' is a methyl or carboxy group, and
B is alkyl having 1 to 4 carbon atoms, benzyl, phenethyl or phenyl, or benzyl, phenethyl or phenyl which is substituted in the benzene radical by fluorine, chlorine, bromine, methyl, methoxy, cyano, sulfo, carboxy, acetyl, nitro, carbamoyl and/or sulfamoyl.

Coupling components which correspond to the compounds of the general formulae (13a) to (13c) and which have a hydrogen atom in place of the Z$^1$ radical, but in whose free amino group the Z$^1$ radical can be introduced after the coupling is complete, are, for example: 1-(3'- or 4'-aminophenyl)-, 1-(2'-sulfo-5'-aminophenyl)- and 1-(2'-methoxy-5'-aminophenyl)-3-carboxy-5-pyrazolone, 1-(3'- or 4'-aminophenyl)- and 1-(3'- or 4'-nitrophenyl)-3-methyl-5-pyrazolone, 1-(3'- or 4'-nitrophenyl)-, 1-(6'-nitro-4',8'-disulfo-2'-naphthyl)-and 1-(6'-amino-4',8'-disulfo-2'-naphthyl)-3-carboxy-5-pyrazolone.

Preferred fiber-reactive coupling components corresponding to the formulae (13a) and (13b) are, for example, compounds of the formulae (14a) to (14h):

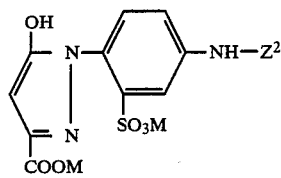
(14a)

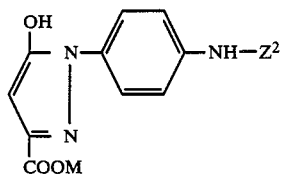
(14b)

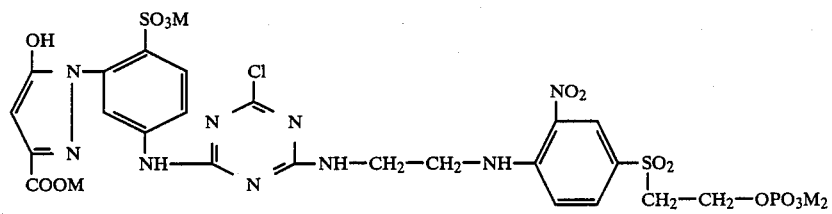
(14c)

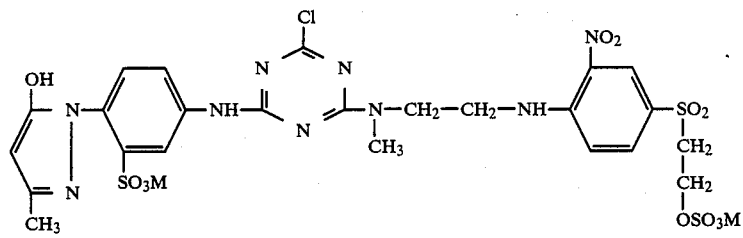
(14d)

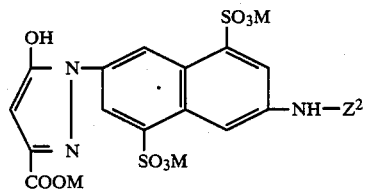
(14e)

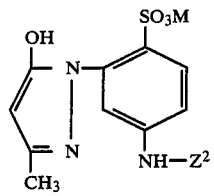
(14f)

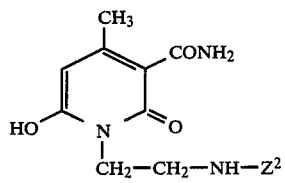
(14g)

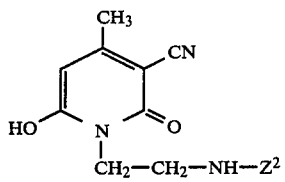
(14h)

in which M and $Z^2$ have the abovementioned meanings.

Of the compounds of the general formula (1) according to the invention, the disazo compounds of the general formulae (15), (16a), (16b) and (16c) are of particular industrial importance:

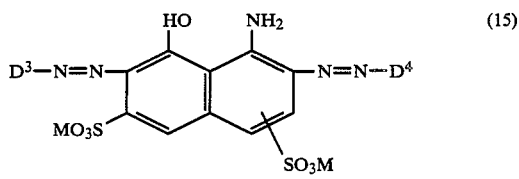
(15)

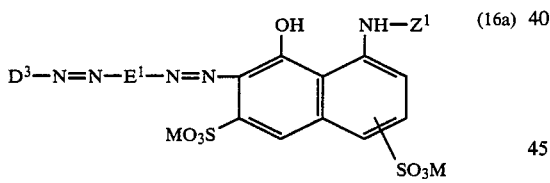
(16a)

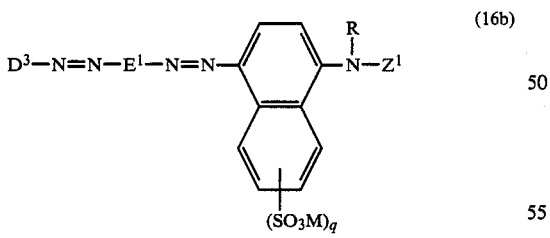
(16b)

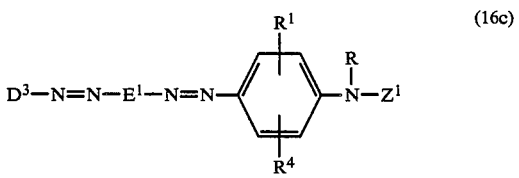
(16c)

In these formulae, the symbols have the following meanings: In formula (15), $D^3$ and $D^4$ have meanings which are identical to one another or different from one another and each is a radical of a diazo component and of which at least one contains a fiber-reactive group of the general formula (3), preferably where R in each case equals hydrogen and especially preferably where m equals 2, and M has the above-mentioned meaning; in a preferred fashion, $D^3$ and $D^4$ are identical to one another or different from one another, each is a radical $D^1$ or $D^2$ corresponding to the abovementioned and defined general formulae (10a) and (10b) or (12), especially preferably a monosulfophenyl, disulfophenyl or mono-, di- or trisulfonaphthyl radical or a radical of the formula (12A), of this especially a radical of the formula (12B)

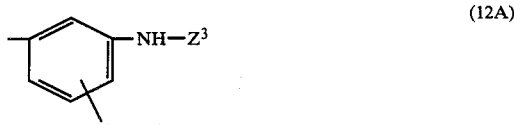
(12A)

(12B)

in which r represents the number 1 or 2, $R^o$ and M have the abovementioned meaning, and $Z^3$ is a radical of the general formula (3c)

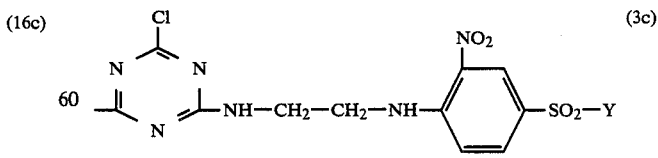
(3c)

where Y has the abovementioned meaning; in formula (16a), $D^3$ and M have the meanings mentioned for formula (15), where $D^3$ is preferably a radical $D^1$ of the formula (10a) or (10b), especially preferably a monosulfophenyl, disulfophenyl, monosulfonaphthyl, disulfonaphthyl or trisulfonaphthyl radical, $Z^1$ is a radical of the general formula (3a), where R in each case preferably equals hydrogen, and especially preferably a radical of the general formula (3c), and $E^1$ is a radical of the general formula (7A) or (7B)

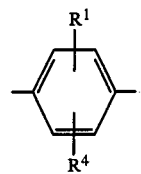 (7A)

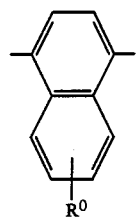 (7B)

where $R^1$, $R^4$ and $R^0$ have the abovementioned meaning, but preferably a radical of the formula (7A); in the formulae (16b) and (16c), $D^3$, $E^1$, M, q, $Z^1$, R, $R^1$ and $R^4$ have the meanings mentioned for formula (15) or (16a), where $D^3$ is preferably a radical $D^1$ of the formula (10a) or (10b), especially preferably a monosulfophenyl, disufophenyl, monosulfonaphthyl, disulfonaphthyl or trisulfonaphthyl radical, R is preferably a hydrogen atom, and, in the formula (16b), $E^1$ is preferably a radical of the formula (7A) and, in formula (16c), preferably a radical of the formula (7B).

Of the compounds of the general formulae (15) and (16), those are preferred in which Y represents the β-phosphatoethyl radical and in particular represents the β-sulfatoethyl radical.

Of the dyes of the general formula (15), those of Examples 121 and 137 can be emphasized, of the dyes of the general formula (16), those of Examples 66, of the dyes of the general formula (16b), those of Examples 67 and 107, and of the dyes of the general formula (16c), those of Examples 100, 101, 102 and 103.

The dyes according to the invention can be prepared in a conventional manner for the synthesis of the dyes, for example by reacting dye intermediates for the appropriate dye class which are well known to those skilled in the art, using the methods of synthesis which are conventional for this dye class, at least one of these dyed intermediates containing a fiber-reactive group of the general formula (3).

Thus, for example, monoazo and disazo dyes corresponding to the general formula (1) can be synthesized by reacting their diazo and coupling components in the procedure for diazotization and coupling which is conventional for this purpose, the diazo or coupling component, or both (in each case), containing a fiber-reactive group of the general formula (3). In the case of synthesis of disazo dyes, the diazo or coupling component can already contain, bonded, the second azo group. Diazo components which can be employed according to the invention are the aromatic carbocyclic and heterocyclic amino compounds which are conventional for fiber-reactive azo dyes and which optionally contain the fiber-reactive group of the general formula (3), and the coupling components which are conventional for synthesis of fiber-reactive azo dyes, for example from the naphthol, aniline, naphthylamine, aminonaphthol, pyrazolone and pyridone series, the coupling component optionally containing the fiber-reactive group of the general formula (3). Such diazo and coupling components are, for example, the compounds, described initially, corresponding to the general formulae (5), (6), (7), (8), (9), (10), (11), (13) and (14).

The diazotization and coupling reactions take place in a conventional manner, i.e. the diazotization generally at a temperature between −5° C. and +15° C. and a pH below 2, by means of a strong acid and an alkali metal nitrite, preferably in an aqueous medium, and the coupling reaction generally takes place at a pH between 1.5 and 4.5 in the case of the amino group-containing coupling components and at a pH between 3 and 7.5 in the case of the hydroxy group-containing coupling component, and at a temperature between 0° and 25°°C., likewise preferably in an aqueous medium.

The novel dyes of the general formula (1) can likewise be prepared according to the invention by reacting cyanuric chloride with an amino compound of the general formula (17)

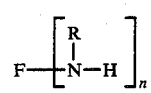 (17)

in which F, R and n have the abovementioned meanings, and an amino compound of the general formula (18)

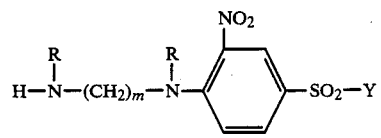 (18)

in which m, R and Y have the abovementioned meanings, in any desired sequence. Thus, it is possible to initially react an amino compound of the general formula (17) with cyanuric chloride to give the dichlorotriazinylamino compound of the general formula (17a)

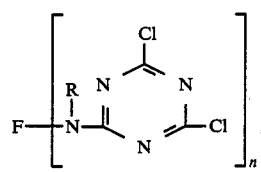 (17a)

where F, R and n have the abovementioned meaning, and the latter is converted into the final dye (1) through reaction with an amino compound of the general formula (18) in an equimolar amount, or an amino compound of the general formula (18) is initially reacted with cyanuric chloride to give the dichlorotriazinylamino compound of the general formula (19)

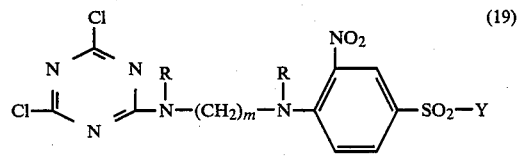 (19)

where m, R and Y have the abovementioned meaning, and the latter, in an equimolar amount, is reacted with the compound of the general formula (17) to give the final dye (1). The condensation reactions between cyanuric chloride or the dichlorotriazinylamino compounds (17a) and (19) with the amino compounds (17) and/or (18) can take place in the conventional manner for reaction of cyanuric chloride or dichlorotriazinylamino compounds with amino compounds, i.e. in an organic or, preferably, an aqueous-organic medium, especially preferably in an aqueous medium, with addition of acid-binding agents, such as alkali metal carbonates, alkaline earth metal carbonates, alkali metal hydrogencarbonates or hydroxides, alkaline-earth metal hydrogen carbonates or hydroxides, or alkali metal acetates, the alkali metals and alkaline-earth metals preferably being sodium, potassium or calcium. Acid-binding agents are likewise tertiary amines, such as, for example, pyridine, triethylamine or quinoline. If these condensation reactions take place in an organic or aqueous organic medium, the (proportionate) organic solvent is acetone, dioxane and dimethylformamide.

The condensation reactions between cyanuric chloride and the amino compounds generally take place at a temperature between $-10°$ C. and $+40°$ C., preferably between $-10°$ C. and $+30°$ C., and at a pH between 1.0 and 7.0, preferably between 3.5 and 5. The reaction of the dichlorotriazinylamino compounds of the general formula (17a) or (19) with an amino compound of the general formula (17) or (18) takes place, for example, at a temperature between 10° and 60° C., preferably between 20° and 50° C., and at a pH between 2 and 8, preferably between 3 and 7, but it must be ensured that the fiber-reactive group is not damaged in the slightly alkaline region.

The starting amino compounds corresponding to the general formula (18) are known from Example 5 of U.S. Pat. No. 3,268,548 or can be prepared analogously to the procedure specified therein. The β-hydroxyethylsulfonyl compound is subsequently esterified, i.e. into the corresponding β-sulfatoethylsulfonyl or β-phosphatoethylsulfonyl compound by means of conventional sulfating and phosphating agents; such methods are known per se and can be applied analogously.

The compounds of the general formula (1) according to the invention are suitable as fiber-reactive dyes for dyeing and printing hydroxy group-containing fibers, in particular cotton, likewise also for synthetic or natural nylon fibers and wool. Suitable dyeing methods are the known dyeing and printing methods for fiber-reactive dyes, in particular those for fiber-reactive dyes which contain a combination of fiber-reactive groups from the chlorotriazine and vinyl sulfone series. Such procedures are described in large number in the general and patent literature, thus, for example, in European Patent Application 0,196,536 A1. In particular, the dyes according to the invention can advantageously be used in the exhaust method at 40° to 80° C. and in the cold pad-batch method. Application is possible in a broad temperature range, and the dyes are distinguished by a high tinctorial strength and a high degree of fixing; their dyeings and prints have high fastnesses.

The Examples below serve to illustrate the invention. The parts mentioned therein are parts by weight, and the percentages represent percentages by weight, unless otherwise stated. Parts by weight relate to parts by volume as the kilogram relates to the liter.

The compounds described by formulae in the Examples are given in the form of free acids; in general, they are prepared and isolated in the form of their sodium or potassium salts and used in the form of their salts for dyeing. Likewise, the starting compounds and components mentioned in the Examples below, in particular Tabulated Examples, in the form of the free acid can be employed as such or in the form of their salts, preferably alkali metal salts, in the synthesis.

The absorption maxima ($\lambda_{max}$) and extinction values E in the visible region given for the compounds according to the invention were determined using their alkali metal salts in aqueous solution. In the Tabulated Examples, the numbers in parentheses after the color shade represent the absorption values in nm.

EXAMPLE 1

38.3 parts of 2-amino-3,6,8-trisulfonaphthalene are diazotized and coupled in a conventional manner with 15.1 parts of N-(3-aminophenyl)-urea, and the azo compound formed is reacted in a fashion which is known per se with 19 parts of finely dispersed cyanuric chloride at 20° C. and at a pH of 6.5, and subsequently with 37 parts of 4-(β-sulfatoethylsulfonyl)-3-nitro-1-(β-aminoethylamino)-benzene at a temperature of 55° to 65° C. and a pH of 6.5. The monoazo compound according to the invention thus formed is precipitated from the aqueous synthesis solution using sodium chloride, and is isolated and dried. A reddish yellow, electrolyte-containing powder of the sodium salt of the compound of the formula

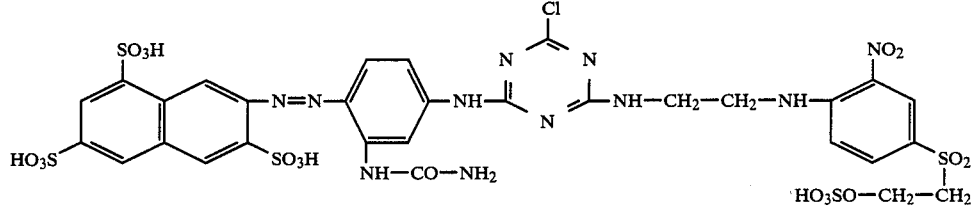

($\lambda_{max}$ = 421 nm)

is obtained which has very good fiber-reactive dye properties and dyes, for example, cellulose fiber materials in strong, clear, reddish yellow shades with high exhaust and fixing values using the application and fixing methods which are conventional for fiber-reactive dyes. The dyeings and prints obtainable using this compound according to the invention exhibit very good light fastnesses and wet fastness properties, such as, in particular, very good washing fastnesses and good wet light fastnesses, of which, in particular, the good alkaline perspiration light fastness can be emphasized.

EXAMPLES 2 to 18

Further dyes according to the invention and corresponding to a general formula (A)

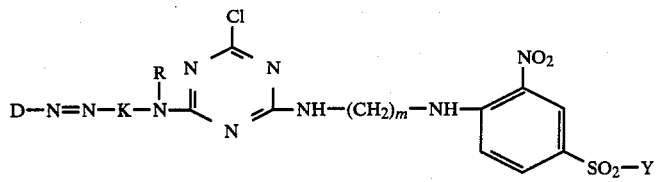

are described in the Tabulated Examples below using the components specified therein. They can be prepared in the manner according to the invention, for example analogously to Example 1, using the fiber-reactive group-free diazo component D-NH$_2$, coupling component H-K-NHR, cyanuric chloride and an amine corresponding to the general formula (18), given in the description, where R in each case equals a hydrogen atom.

These monoazo compounds (dyes) according to the invention likewise have very good fiber-reactive dye properties and dye, in particular, cellulose materials in the strong, clear, fast color shades given in the particular Tabulated Example.

EXAMPLE 19

37 parts of 4-(β-sulfatoethylsulfonyl)-3-nitro-1-(β-aminoethylamino)-benzene are suspended in 500 parts of water, and the suspension is reacted at 20° C. and a pH of 2 to 2.5 while stirring with 19 parts of finely dispersed cyanuric chloride. A neutral solution of 18.8 parts of 1,3-diaminobenzene-4-sulfonic acid in 200 parts of water is then added, and the second condensation reaction is carried out at 70° C, and a pH of 4 to 5. The diazo component thus obtained containing the fiber-reactive group is diazotized and coupled with 23.3 parts of N-(β-sulfoethyl)-4-methyl-6-hydroxy-2-pyridone at a temperature of 10° C. and a pH of 6.5.

The compound according to the invention is subsequently isolated from the synthesis batch, for example by spraydrying or by salting-out using sodium chloride.

| Ex. | Diazo component D-NH$_2$ | Coupling component H—K—NHR | m | Y | Color shade |
|---|---|---|---|---|---|
| 2 | 2-Amino-3,6,8-trisulfo-naphthalene | N—(3-Aminophenyl)-urea | 3 | β-Sulfato-ethyl | golden yellow |
| 3 | " | " | 2 | β-Phosphato-ethyl | golden yellow |
| 4 | " | N—Phenyl-N'—(3-aminophenyl)-urea | 2 | β-Phosphato-ethyl | golden yellow |
| 5 | " | N—(3-Aminophenyl)-N'—methyl-urea | 2 | β-Sulfato-ethyl | golden yellow |
| 6 | " | 3-Acetylaminoaniline | 2 | β-Sulfato-ethyl | golden yellow |
| 7 | " | 3-Propionylaminoaniline | 3 | β-Phosphato-ethyl | golden yellow |
| 8 | 2-Amino-6,8-disulfo-naphthalene | " | 2 | β-Sulfato-ethyl | golden yellow |
| 9 | " | 3-Acetylaminoaniline | 2 | " | golden yellow |
| 10 | " | N—(3-Aminophenyl)-urea | 2 | " | golden yellow |
| 11 | 2-Amino-4,8-disulfo-naphthalene | " | 2 | β-Sulfato-ethyl | golden yellow |
| 12 | " | N—Cyclohexy-N'—(3-aminophenyl)-urea | 3 | β-Phosphato-ethyl | golden yellow |
| 13 | " | 3-(Methylsulfonylamino-aniline | 2 | β-Sulfato-ethyl | golden yellow |
| 14 | 2-Amino-1,6-disulfo-naphthalene | N—(3-Aminophenyl)-urea | 2 | β-Sulfato-ethyl | golden yellow |
| 15 | " | N—(3-Aminophenyl)-N'—methyl-urea | 2 | " | golden yellow |
| 16 | 2-Amino-3,6,8-trisulfo-naphthalene | N—(3-Aminophenyl)-urea | 3 | Vinyl | golden yellow |
| 17 | " | " | 2 | Vinyl | golden yellow |
| 18 | " | 3-Acetylaminoaniline | 2 | Vinyl | golden yellow |

An electrolyte-containing product of the alkali metal salt of the compound of the formula

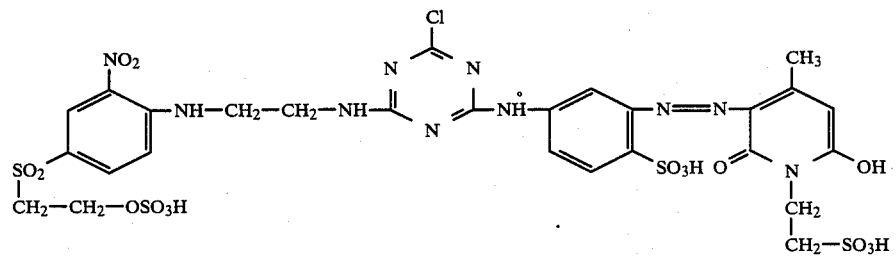

($\lambda_{max}$ = 416 nm)

is obtained which has very good dye properties and gives strong clear dyeings and prints of a greenish yellow shade with very good light and wet fastness properties on, for example, cellulose fiber materials.

EXAMPLE 20

A primary condensation product, prepared by a conventional route, of 18.8 parts of 1,3-diaminobenzene-4-sulfonic acid and 19 parts of cyanuric chloride is diazotized and coupled to 28.5 parts of 1-(4'-sulfophenyl)-3-carboxy-5-pyrazolone at a pH between 5 and 7. An aqueous, neutral solution of 37 parts of 4-($\beta$-sulfatoethylsulfonyl)-3-nitro-1-($\beta$-aminoethylamino)-benzene is then added; the reaction batch is warmed to 40° C. and adjusted to a pH of 7, and the (second) condensation reaction with the dichlorotriazinylamino compound is carried out to completion at this temperature and at this pH. The formed compound according to the invention is salted-out using potassium chloride, isolated and dried.

The compound has, described in the form of the free acids, the formula

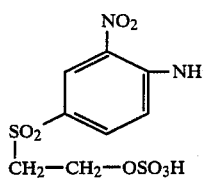
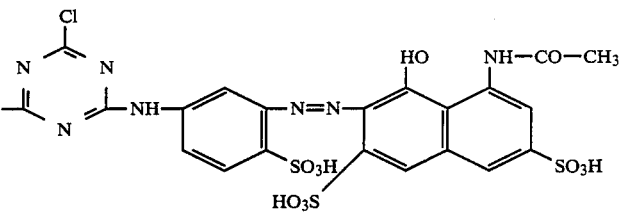

1-acetylamino-3,6-disulfo-8-naphthol. The dichlorotriazinylamino azo compound obtained is reacted, in a second condensation reaction, with 4-($\beta$-sulfatoethylsulfonyl)-3-nitro-1-($\beta$-aminoethylamino)-benzene at a temperature of 55° to 65° C. and a pH of 6.5.

The monoazo compound according to the invention is isolated in a conventional manner as the alkali metal salt; it has, described in the form of the free acid, the formula

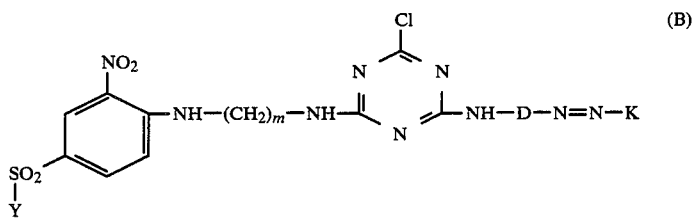

($\lambda_{max}$ = 504 nm)

and dyes, for example, cotton in brilliant, fast, red shades by the application and fixing methods which are conventional for fiber-reactive dyes.

EXAMPLE 22 to 63

In the following Tabulated Examples, further compounds according to the invention and corresponding to a general formula (B)

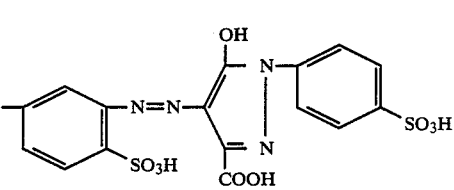

(B)

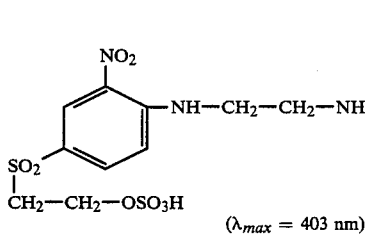

($\lambda_{max}$ = 403 nm)

and exhibits very good dye properties. The compound dyes, for example, cellulose fiber materials in fast, yellow shades by the application and fixing methods which are conventional in industry for fiber-reactive dyes.

EXAMPLE 21

The monocondensation product, prepared by a conventional route, of 1,3-diaminobenzene-4-sulfonic acid with cyanuric chloride is diazotized and coupled to are described with the aid of the radicals and components given therein. They can be prepared in the manner according to the invention, for example analogously to Example 19, 20 or 21, from these components (cyanuric chloride, a diaminobenzene compound corresponding to the general formula $H_2N-D-NH_2$, an amino compound corresponding to the general formula (18) given in the description, where R is in each case a hydrogen atom, and the coupling component H-K). These novel compounds corresponding to the general formula (1) likewise have very good fiber-reactive dye properties and dye the fiber materials given in the description, in particular cellulose fiber materials, in strong fast shades (the shades in the Tabulated Examples relate to dyeings on cellulose fiber materials).

| Ex. | Radical D of the diamine $H_2N-D-NH_2$ | Coupling component H—K | m | Y | Color shade |
|---|---|---|---|---|---|
| 22 | 4,6-disulfo-1,3-phenylene (HO$_3$S and SO$_3$H on benzene) | N—(β-Sulfatoethyl)-4-methyl-5-carbamoyl-6-hydroxy-2-pyridone. | 3 | β-Sulfatoethyl | greenish yellow |
| 23 | " | N—(γ-Methoxypropyl)-4-methyl-6-hydroxy-2-pyridone | 2 | " | " |
| 24 | 4-sulfo-1,3-phenylene (SO$_3$H on benzene) | 4-Methyl-5-sulfomethyl-6-hydroxy-2-pyridone | 2 | " | " |
| 25 | " | N—(γ-Methoxypropyl)-4-methyl-5-sulfomethyl-6-hydroxy-2-pyridone | 2 | " | " |
| 26 | " | N—(γ-Sulfatoethyl)-4-methyl-6-hydroxy-2-pyridone | 2 | " | " |
| 27 | 4,6-disulfo-1,3-phenylene (HO$_3$S and SO$_3$H on benzene) | N—(γ-Phosphatoethyl)-4-methyl-6-hydroxy-2-pyridone | 2 | β-Phosphatoethyl | " |
| 28 | " | N—(β-Sulfoethyl)-4-methyl-6-hydroxy-2-pyridone | 3 | " | " |
| 29 | " | 1-(2'-Methyl-4'-sulfo-phenyl)-3-carboxy-5-pyrazolone | 2 | β-Sulfatoethyl | yellow |
| 30 | " | " | 3 | " | yellow |
| 31 | " | 1-(2'-Methyl-4'-sulfo-phenyl)-3-carboxy-5-pyrazolone | 2 | β-Phosphatoethyl | yellow |
| 32 | " | 3,6-Disulfo-1-naphthol | 2 | β-Sulfatoethyl | orange |
| 33 | " | 3,8-Disulfo-1-naphthol | 2 | β-Phosphatoethyl | scarlet |
| 34 | " | 4,8-Disulfo-1-naphthol | 3 | β-Sulfatoethyl | yellowish red |
| 35 | " | 3,3'-Disulfo-7-(phenylamino)-1-naphthol | 2 | " | brown |
| 36 | " | 1-(4'-Sulfophenyl)-3-carboxy-5-pyrazolone | 3 | β-Phosphatoethyl | yellow |
| 37 | 2,5-disulfo-1,4-phenylene (SO$_3$H at 2 and 5) | " | 2 | " | yellow |
| 38 | 4,6-disulfo-1,3-phenylene (HO$_3$S and SO$_3$H on benzene) | 1-Phenyl-3-carboxy-5-pyrazolone | 2 | β-Sulfatoethyl | yellow |
| 39 | " | " | 3 | " | yellow |
| 40 | 4-sulfo-1,3-phenylene (SO$_3$H on benzene) | 3,6-Disulfo-1-naphthol | 2 | Vinyl | yellow |
| 41 | " | 1-(4'-Sulfophenyl)-3-carboxy-5-pyrazolone | 2 | Vinyl | yellow |
| 42 | " | N—(β-Sulfoethyl)-4-methyl-5-cyano-6-hydroxy-2-pyridone | 2 | Vinyl | greenish yellow |
| 43 | " | N—(β-Sulfoethyl)-4-methyl-5-sulfomethyl-6-hydroxy-2-pyridone | 2 | β-Sulfatoethyl | " |
| 44 | " | N—(β-Sulfoethyl)-4-methyl-5-sulfo-6-hydroxy-2-pyridone | 2 | " | " |

-continued

| Ex. | Radical D of the diamine $H_2N-D-NH_2$ | Coupling component H—K | m | Y | Color shade |
|---|---|---|---|---|---|
| 45 | H₃C—⟨benzene⟩—SO₃H | " | 2 | β-Phosphato-ethyl | " |
| 46 | HO₃S—⟨benzene⟩—SO₃H | N—(β-Sulfoethyl)-4-methyl-5-cyano-6-hydroxy-2-pyridone | 2 | β-Sulfato-ethyl | " |
| 47 | ⟨benzene⟩—SO₃H | 1-Acetylamino-3,6-disulfo-8-naphthol | 3 | " | red |
| 48 | " | 1-Benzoylamino-3,6-disulfo-8-naphthol | 2 | " | red |
| 49 | " | 1-[(N'—Cyclohexy)-ureido]-3,6-disulfo-8-naphthol | 2 | " | red |
| 50 | " | 4,8-Disulfo-1-naphthol | 2 | " | red |
| 51 | " | 4-Sulfo-1-naphthol | 2 | " | red |
| 52 | " | " | 2 | β-(Methyl-sulfonyloxy)-ethyl | red |
| 53 | ⟨benzene⟩—SO₃H | 1-Acetylamino-3,6-disulfo-8-naphthol | 2 | β-Sulfato-ethyl | red |
| 54 | " | " | 2 | β-Phosphato-ethyl | red |
| 55 | " | " | 3 | β-Sulfato-ethyl | red |
| 56 | HO₃S—⟨benzene⟩—SO₃H | 1-Benzoylamino-3,6-disulfo-8-naphthol | 2 | " | red |
| 57 | " | 1-Benzoylamino-4,6-disulfo-8-naphthol | 2 | " | red |
| 58 | " | " | 2 | β-Phosphato-ethyl | red |
| 59 | ⟨benzene with CH₃ and SO₃H⟩ | " | 2 | " | red |
| 60 | " | " | 2 | β-Sulfato-ethyl | red |
| 61 | ⟨benzene⟩—SO₃H | 1-Acetylamino-3,6-disulfo-8-naphthol | 2 | Vinyl | red |
| 62 | " | 1-Benzoylamino-3,6-disulfo-8-naphthol | 2 | Vinyl | red |
| 63 | " | 1-Benzoylamino-4,6-disulfo-8-naphthol | 2 | Vinyl | red |

EXAMPLE 64

95 parts of cyanuric chloride are reacted with 160 parts of 1-amino-3,6-disulfo-8-naphthol in a procedure which is known per se, for example in an aqueous medium at a temperature between 10° and 15° C. and a pH of 2 to 2.5; the monocondensation product is then coupled at a pH between 4 and 4.5 and a temperature between 10° and 20° C. with the diazonium salt prepared from 87 parts of 1-aminobenzene-2-sulfonic acid. 185 parts of 4-(β-sulfatoethylsulfonyl)-3-nitro-1-(β-aminoethylamino)-benzene are then added, and the second condensation reaction is carried out at pH 6 and a temperature between 50° and 60° C.

to the procedure of Example 1, with the equimolar amount of 4-(β-sulfatoethylsulfonyl)-3-nitro-1(β-aminoethylamino)-benzene. The compound according to the invention is precipitated using potassium chloride and isolated; it has, described in the form of the free acid, the formula

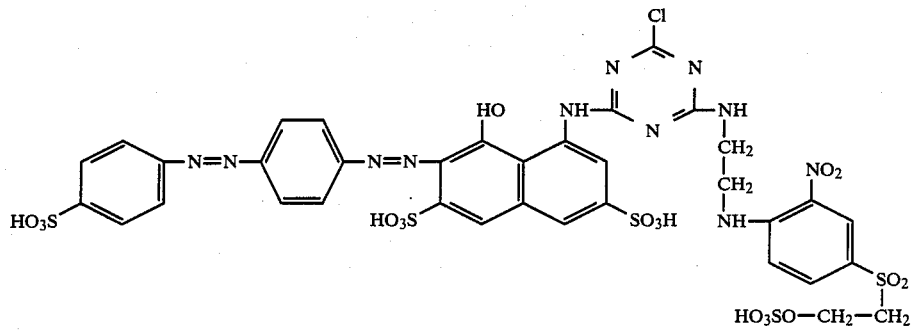

The formed compound according to the invention is precipitated using potassium chloride and isolated. It has, described in the form of the free acid, the formula

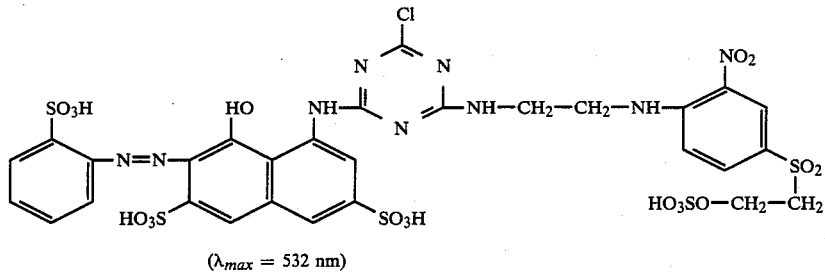

($\lambda_{max}$ = 532 nm)

and exhibits very good dye properties. It dyes the fiber materials mentioned in the description in fast red shades and gives, in particular on cellulose fiber materials, dyeings in bright red shades having very good wet fastness properties, such as a very good chlorinated water fastness and very good wet light fastnesses, such as, in particular, very good alkaline perspiration light fastness, by the application methods which are conventional for fiber-reactive dyes.

EXAMPLE 65

1-Amino-3,6-disulfo-8-naphthol is reacted with cyanuric chloride using a conventional procedure to give the monocondensation product, and the latter is coupled with the diazonium salt of 4-(4'-sulfophenylazo)-aniline. This diazo compound is then reacted, according and dyes cotton, for example, in very fast red-violet shades by conventional dyeing methods.

EXAMPLE 66

38.3 parts of 2-aminonaphthalene-3,6,8-trisulfonic acid are diazotized in a conventional manner and coupled at a pH of 3 to 13.7 parts of 3-amino-4-methoxytoluene. The amino azo compound is diazotized in its aqueous synthesis solution and the diazotized product is coupled, at a pH of 6 to 6.5 and at a temperature between 20° and 25° C., to 80 parts of the condensation product prepared from 1-amino-8-naphthol-3,6-disulfonic acid, cyanuric chloride and 4-(β-sulfatoethylsulfonyl)-3-nitro-1-(β-aminoethylamino)-benzene in a known procedure.

The disazo compound according to the invention is then precipitated using potassium chloride and isolated. A black, electrolyte-containing powder of the alkali metal salt of the compound of the formula

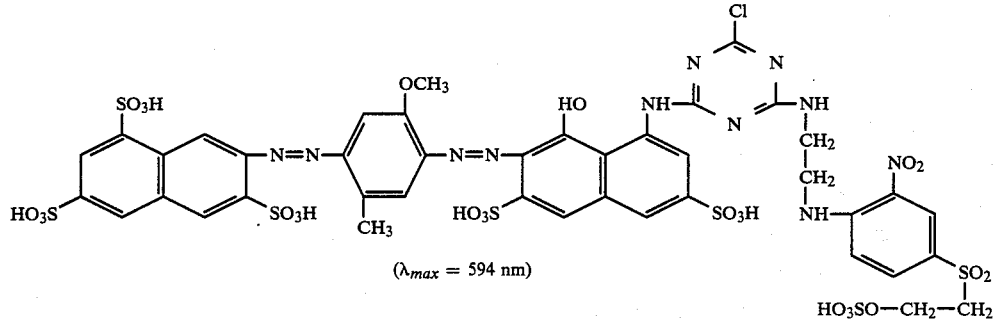

($\lambda_{max}$ = 594 nm)

is obtained. This disazo compound according to the invention exhibits very good fiber-reactive dye properties and dyes cotton, in particular, in strong, fast, navy-blue shades.

EXAMPLE 67

19 parts of cyanuric chloride are reacted in 300 parts of water at a pH of 6.5 and at a temperature of 0° to 5° C., initially with 77 parts of the known amino-disazo compound of the formula

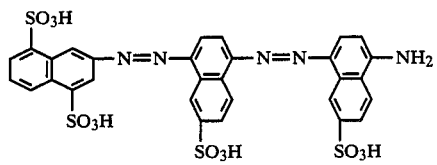

and then, at a temperature of 55° to 65° C. and a pH of 6 to 6.5, with 37 parts of 4-(β-sulfatoethylsulfonyl)-3-nitro-1-(β-aminoethylamino)-benzene. The obtained disazo compound according to the invention is precipitated from its synthesis solution using potassium chloride and isolated. An electrolyte-containing powder of the alkali metal salt of the compound of the formula is obtained which has very good fiber-reactive dye properties and gives, in particular on cotton, intense dyeings and prints in fast, reddish brown shades by the dyeing and printing methods which are conventional for this.

EXAMPLES 68 to 120

In the following Tabulated Examples, further compounds according to the invention and corresponding to the general formula (A)

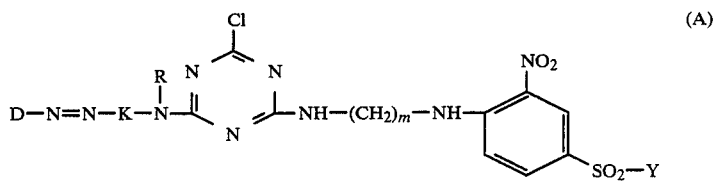

are described with the aid of the radicals or components given therein. They can be prepared in the manner according to the invention, for example analogously to one of Examples 1 and 64 to 67, with the aid of these components (the diazo component $D-NH_2$ which is free of a fiber-reactive group, the coupling component H-K-NHR whose amino group optionally already contains the fiber-reactive chlorotriazinylamino group, cyanuric chloride and, if appropriate, an amine corresponding to the general formula (18), given in the description, where R in each case equals a hydrogen atom).

These azo compounds according to the invention and corresponding to the general formula (1) likewise have very good fiber-reactive dye properties; in particular on cellulose fiber materials, intense, clear, fast dyeings and

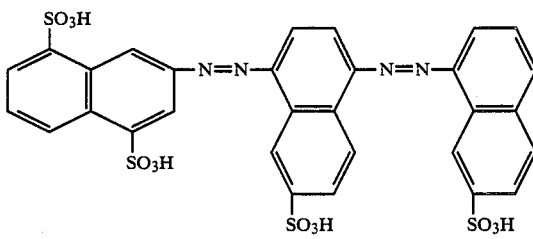
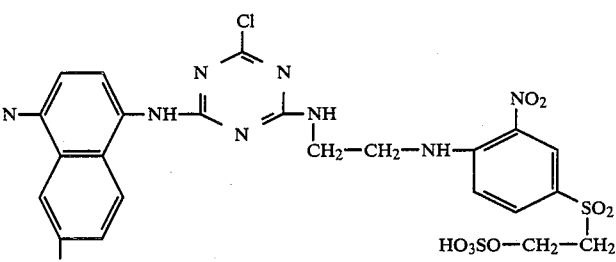

($\lambda_{max}$ = 445 nm)

prints in the color shade given in the particular Tabulated Example are obtained using them.

| Ex. | Radical D of the diazo component $D-NH_2$ | Component H-K-NHR | m | Y group | Color Shade |
|---|---|---|---|---|---|
| 68 | 4-Phenoxy-2-sulfophenyl | 1-Amino-3,6-disulfo-8-naphthol | 2 | β-Sulfato-ethyl | bluish red |
| 69 | 4-Ethoxyphenyl | " | 2 | " | " |
| 70 | 4-Methoxyphenyl | " | 2 | " | " |
| 71 | 4-Methyl-2-sulfophenyl | " | 2 | " | " |
| 72 | 4-Sulfophenyl | " | 2 | " | red |
| 73 | 3-Sulfophenyl | " | 2 | " | red |
| 74 | 1,5-Disulfo-naphth-2-yl | " | 2 | " | red |
| 75 | 4,8-Disulfo-naphth-2-yl | " | 2 | " | red |
| 76 | 4-Sulfo-naphth-1-yl | " | 2 | " | red |
| 77 | 6-Sulfo-naphth-1-yl | " | 2 | " | red |
| 78 | 1-Sulfo-naphth-2-yl | " | 2 | " | red |
| 79 | 5-Sulfo-naphth-2-yl | " | 2 | β-(Methyl-sulfonyloxy)-ethyl | red |
| 80 | 6-Sulfo-naphth-2-yl | " | 2 | β-Phosphato- | red |

-continued

| Ex. | Radical D of the diazo component D-NH$_2$ | Component H-K-NHR | m | Y group | Color Shade |
|---|---|---|---|---|---|
| 81 | Phenyl | 1-Amino-4,6-disulfo-8-naphthol | 2 | β-Sulfato-ethyl | scarlet |
| 82 | 2-Sulfophenyl | " | 2 | " | scarlet |
| 83 | " | 1-Amino-4-sulfo-8-naphthol | 2 | " | scarlet |
| 84 | " | " | 2 | β-(Methyl-sulfonyloxy)-ethyl | scarlet |
| 85 | " | 2-Amino-6-sulfo-8-naphthol | 3 | β-Sulfato-ethyl | red |
| 86 | Phenyl | 1-Amino-2,4-disulfo-8-naphthol | 2 | " | red |
| 87 | 4-Sulfophenyl | 2-Amino-7-sulfo-5-naphthol | 2 | " | orange |
| 88 | 1,5-Disulfo-naphth-2-yl | " | 2 | " | orange |
| 89 | " | 2-Methylamino-7-sulfo-5-naphthol | 2 | " | orange |
| 90 | " | " | 2 | β-(Methyl-sulfonyloxy)-ethyl | orange |
| 91 | Phenyl | 1-Amino-3,6-disulfo-8-naphthol | 2 | β-Sulfato-ethyl | red |
| 92 | " | " | 3 | " | red |
| 93 | " | " | 2 | β-(Methyl-sulfonyloxy)-ethyl | red |
| 94 | " | " | 2 | β-Phosphato-ethyl | red |
| 95 | 2-Chlorophenyl | " | 2 | β-Sulfato-ethyl | red |
| 96 | 3-Methylphenyl | " | 2 | " | red |
| 97 | 4-Methoxy-2-sulfophenyl | " | 2 | " | bluish red |
| 98 | " | " | 2 | Vinyl | bluish red |
| 99 | 1,5-Disulfo-naphth-2-yl | " | 2 | Vinyl | red |
| 100 | 4-(4',8'-Disulfo-naphth-2'-yl-azo)-7-sulfo-naphth-1-yl | 3-Methylaniline | 2 | β-Sulfato-ethyl | reddish brown (441) |
| 101 | 4-(4',8'-Disulfo-naphth-2'-yl-azo)-(6,7)-monosulfo-naphth-1-yl | 2-Methoxy-5-methyl-aniline | 2 | " | reddish brown (443) |
| 102 | " | 2,5-Dimethylaniline | 2 | " | reddish brown (441) |
| 103 | 4-(4',6',8'-Trisulfo-naphth-2'-yl-azo)-6-sulfo-naphth-1-yl | 3-Methylaniline | 2 | " | reddish brown (444) |
| 104 | 4-(2',5',7'-Trisulfo-naphth-1'-yl-azo)-naphth-1-yl | 7-Sulfo-1-amino-naphthalene | 2 | " | red-brown |
| 105 | 4-(2',5'-Disulfo-phenylazo)-2,5-dimethylphenyl | 8-Sulfo-1-amino-naphthalene | 2 | " | orange-brown |
| 106 | 4-(4',6',8'-Trisulfo-naphth-2'-yl-azo)-phenyl | Aniline | 2 | " | orange-brown |
| 107 | 4-(4',8'-Disulfo-naphth-2'-yl-azo)-7-sulfo-naphth-1-yl | 8-Sulfo-1-amino-naphthanlene | 2 | " | reddish brown (445) |
| 108 | 4-(3',6',8'-Trisulfo-naphth-2'-yl-azo)-2,5-dimethylphenyl | 1-Amino-3,6-disulfo-8-naphthol | 2 | " | navy blue |
| 109 | 4-(3',6',8'-Trisulfo-naphth-2'-yl-azo)-3-methylphenyl | " | 2 | β-Phosphato-ethyl | " |
| 110 | 4-(3',6',8'-Trisulfo-naphth-2'-yl-azo)-2-methyl-5-methoxy-phenyl | " | 2 | β-Sulfato-ethyl | " |
| 111 | 4-(3',6',8'-Trisulfo-naphth-2'-yl-azo)-5-chlor-2-methyl-phenyl | " | 2 | β-(Methyl-sulfonyloxy)-ethyl | " |
| 112 | 4-(4',6',8'-Trisulfo-naphth-2'-yl-azo)-2,5-dimethylphenyl | " | 2 | β-Sulfato-ethyl | " |
| 113 | 4-(1',5',7'-Trisulfo-naphth-2'-yl-azo)-2,5-dimethylphenyl | " | 2 | β-Sulfato-ethyl | " |
| 114 | 4-(6',8'-Disulfo-naphth-2'-yl-azo)-2-methyl-5-methoxyphenyl | " | 2 | β-Sulfato-ethyl | " |
| 115 | 4-(5',7'-Disulfo-naphth-2'-yl-azo)-3-methylphenyl | " | 2 | β-Phosphato-ethyl | " |
| 116 | " | " | 2 | β-Sulfato-ethyl | " |
| 117 | 4-(4',8'-Disulfo-6'-nitro-naphth-2'-yl-azo)-2-methyl-5-methoxyphenyl | " | 2 | β-Sulfato-ethyl | " |
| 118 | 4-(4',8'-Disulfo-naphth-2'-yl-azo)-2-methyl-5-methoxyphenyl | " | 2 | β-Sulfato-ethyl | " |

-continued

| Ex. | Radical D of the diazo component D-NH$_2$ | Component H-K-NHR | m | Y group | Color Shade |
|---|---|---|---|---|---|
| 119 | 4-(4',6',8'-Trisulfo-naphth-2'-yl-azo)-6-sulfo-naphth-1-yl | 3-Methylaniline | 2 | Vinyl | reddish brown |
| 120 | " | 2-Methoxy-5-methyl-aniline | 2 | Vinyl | " |

EXAMPLE 121

An aqueous suspension of 31.6 parts of 1-amino-3,6-disulfo-8-naphthol is stirred into an aqueous solution containing hydrochloric acid, of the diazonium salt of 17.3 parts of aniline-4-sulfonic acid at 5° C., and the coupling is carried out at a pH between 1 and 2. The aqueous suspension containing hydrochloric acid of the diazonium salt of 38.6 parts of a primary condensation product prepared by a conventional route from cyanuric chloride and 1,3-diaminobenzene-4-sulfonic acid is then added, and a pH of 5 to 6 is set using sodium carbonate in order to carry out the coupling reaction. An aqueous, neutral solution containing 37 parts of 4-($\beta$-sulfatoethylsulfonyl)-3-nitro1-($\beta$-aminoethylamino)-benzene is then added to the solution of the disazo compound thus obtained, and the condensation reaction is carried out to completion at 30° to 40° C. and at a pH of 7 to 7.5.

The disazo compound according to the invention is precipitated from the neutral synthesis solution by means of potassium chloride, and is isolated and dried. A black, electrolyte-containing powder of the alkali metal salt of the compound of the formula

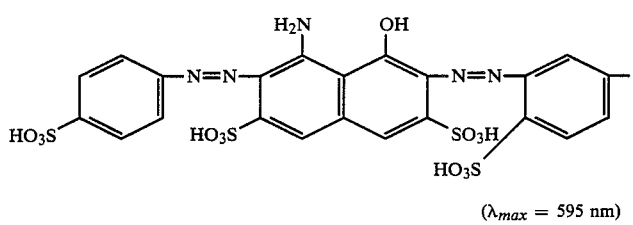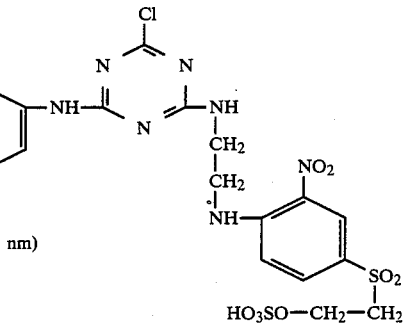

($\lambda_{max}$ = 595 nm)

is obtained which has very good fiber-reactive dye properties and dyes cotton, for example, in fast navy-blue shades by the dyeing and printing methods which are conventional for fiber-reactive dyes.

EXAMPLES 122 to 136

In the following Tabulated Examples, further disazo compounds according to the invention and corresponding to a general formula (C)

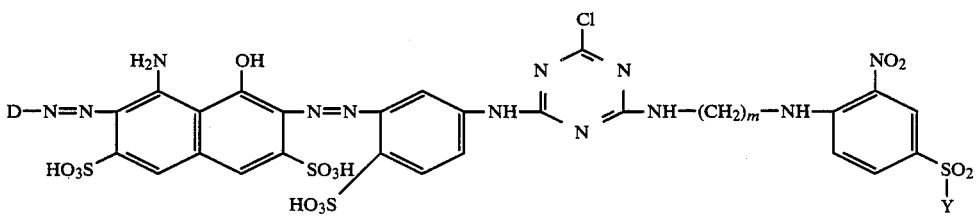

are described with the aid of the radicals given therein. They can be prepared in the manner according to the invention, for example analogously to the procedure of Examples 19 and 121, with the aid of the components shown therein (1-amino-3,6-disulfo-8-naphthol as the divalent coupling component, the acid-coupled diazo component D-NH$_2$, 1,3-diaminobenzene-4-sulfonic acid, cyanuric chloride and an amine corresponding to the general formula (18), given in the description, where R in each case equals a hydrogen atom). These disazo compounds according to the invention likewise have very good fiber-reactive dye properties and give, in particular on cellulose fiber materials, intense fast dyeings and prints in the color shade given in the particular Tabulated Example.

| Ex. | Diazo component D-NH$_2$ | m | Y group | Color Shade |
|---|---|---|---|---|
| 122 | 2-Chloro-4-sulfo-aniline | 2 | $\beta$-Sulfatoethyl | navy blue |
| 123 | 2-Chloro-4,6-disulfo-aniline | 2 | $\beta$-(Methylsulfonyloxy)-ethyl | reddish navy blue |
| 124 | 4-Chloro-2-sulfo-aniline | 2 | $\beta$-Phosphatoethyl | " |
| 125 | 1,5-Disulfo-2-amino-naphthalene | 2 | $\beta$-Sulfatoethyl | greenish navy blue |
| 126 | 4-Ethylsulfonyl-aniline | 3 | " | reddish navy blue |
| 127 | 2-Methyl-4,6-di-sulfoaniline | 3 | $\beta$-(Methylsulfonyloxy)-ethyl | " |
| 128 | 3,6,8-Trisulfo-2-amino naphthalene | 2 | $\beta$-Sulfatoethyl | greenish navy blue |
| 129 | 4-($\beta$-Sulfatoethylsulfonyl)- aniline | 2 | " | reddish navy blue |
| 130 | 2-Sulfo aniline | 2 | " | " |
| 131 | 3-[2'-Chloro-4'-(3"-sulophenyl-amino)-s-triazin- | 2 | " | " |

EXAMPLES 138 to 149

In the following Tabulated Examples, further disazo compounds according to the invention and corresponding to a general formula (D)

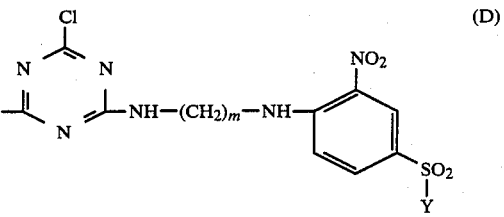

are described with the aid of the radicals given therein. They can be prepared in the manner according to the invention, for example analogously to the procedure of Example 137, with the aid of the components given therein (1-amino-3,6-disulfo-8-naphthol as the divalent coupling component, the diazo component D-NH₂, coupled under slightly acidic to neutral conditions, 1,3-diaminobenzene-4-sulfonic acid as the diazo component portion which can be coupled under acid conditions, cyanuric chloride and an amine corresponding to the general formula (18), given in the description, where R in each case equals a hydrogen atom). These disazo compounds according to the invention likewise have very good fiber-reactive dye properties and give, in particular on cellulose fiber materials, intense fast dyeings and prints in the color shade given in the particular tabulated example.

-continued

| Ex. | Diazo component D-NH₂ | m | Y group | Color Shade |
|---|---|---|---|---|
|  | 6'-yl]-amino-6-sulfoaniline |  |  |  |
| 132 | " | 3 | " | " |
| 133 | 3-[2'-Chloro-4'-(4''-β-sulfatoethylsulfonyl-phenylamino)-s-triazin-6'-yl]-amino-6-sulfoaniline | 2 | " | " |
| 134 | Aniline | 2 | " | " |
| 135 | 3,6,8-Trisulfo-2-aminonaphthalene | 2 | Vinyl | greenish navy blue |
| 136 | 4-Sulfoaniline | 2 | Vinyl | navy blue |

EXAMPLE 137

66.9 parts of the secondary condensation product prepared from 1,3-diaminobenzene-4-sulfonic acid, cyanuric chloride and 4-(β-sulfatoethylsulfonyl)-3-nitro-1-(β-aminoethylamino)-benzene are diazotized in a conventional manner in hydrochloric acid solution, and are then subjected to acidic coupling with 30.8 parts of 1-amino-3,6-disulfo-8-naphthol. An aqueous solution, in hydrochloric acid, of the diazonium salt of 17.3 parts of aniline-4-sulfonic acid is subsequently added to the resultant monoazo compound in its synthesis solution, the reaction batch is adjusted to a pH of 7, and the coupling reaction is carried out to completion in the neutral region to give the diazo compound.

The disazo compound according to the invention is precipitated from its synthesis solution by means of potassium chloride, and is isolated and dried. A black, electrolyte-containing powder containing the alkali metal salt of the compound of the formula

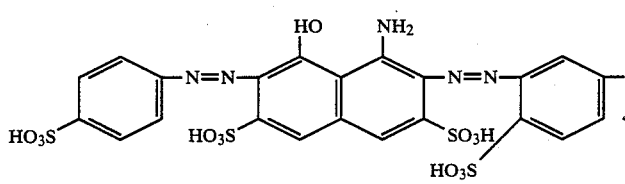

($\lambda_{max}$ = 584 nm)

is obtained which has very good fiber-reactive dye properties and dyes cotton, for example, in fast reddish navy-blue shades by the dyeing and printing methods which are conventional for fiber-reactive dyes.

| Ex. | Diazo component D-NH₂ | m | Y group | Color Shade |
|---|---|---|---|---|
| 138 | 1,5-Disulfo-2-aminonaphthalene | 2 | β-Phosphatoethyl | reddish navy blue |
| 139 | 2-Chloro-4,6-disulfoaniline | 3 | β-Sulfatoethyl | " |
| 140 | 2-Chloro-4-sulfoaniline | 2 | β-(Methylsulfonyloxy)-ethyl | " |
| 141 | 2-Methyl-4,6-disulfoaniline | 2 | β-Sulfatoethyl | " |
| 142 | 4-(β-Sulfatoethylsulfonyl)-aniline | 2 | " | " |
| 143 | 2-Sulfoaniline | 2 | " | " |
| 144 | 3,6,8-Trisulfo-2-aminonaphthalene | 2 | " | " |
| 145 | Aniline | 2 | " | " |
| 146 | Aniline | 3 | β-Phosphatoethyl | " |
| 147 | 4-Sulfamoylaniline | 2 | β-Sulfatoethyl | " |
| 148 | 4-Sulfoaniline | 2 | Vinyl | " |
| 149 | 3,6,8-Trisulfo-2-aminonaphthalene | 2 | Vinyl | " |

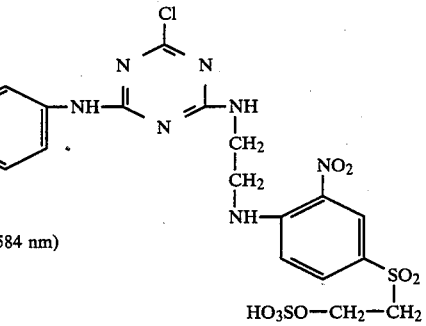

We claim:
1. A compound which corresponds to the formula

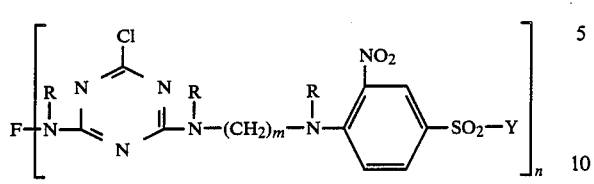

in which:
F denotes the radical of a sulfo group-containing monoazo or disazo dye;
m denotes the number 2 or 3;
n denotes the number 1 or 2;
R denotes a hydrogen atom or an alkyl group having 1 to 4 carbon atoms; and
Y denotes the vinyl group or a group of the formula

—CH$_2$—CH$_2$—X in which X represents a substituent which can be eliminated as an anion, by means of an alkali.

2. A compound as claimed in claim 1, wherein each R represents hydrogen and Y represents β-sulfatoethyl or β-phosphatoethyl.

3. A compound as claimed in claim 1, corresponding to the formula (4)

in which
D represents the radical of a diazo component,
E represents

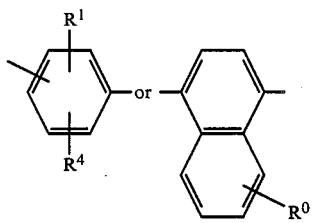

in which
R$^1$ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-(C$_1$–C$_4$-alkyl)-carbamoyl, fluorine, chlorine, bromine or trifluoromethyl,
R$^4$ is hydrogen, alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, cycloalkylureido having 5–8 carbon atoms in the cycloalkyl part, phenylsulfonyl or alkylsulfonyl having 1 to 4 carbon atoms, or alkylsulfonylamino having 1 to 4 carbon atoms,
R$^0$ is a hydrogen atom or a sulfo group, and
M denotes a hydrogen atom or an alkali metal;
K represents the radical of a coupling component, and
V represents the number zero or 1, n is the number 1 or 2 and Z denotes a radical of the formula

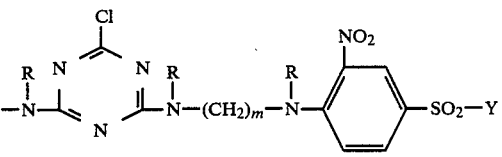

in which R, m and Y have the meanings mentioned in claim 1, the radical Z being bonded to the radical D or to the radical K or, in the case where n=2, to each of D and K.

4. A compound as claimed in claim 3, wherein n represents the number 1 and Z is bonded to K, and D denotes a radical of the formula

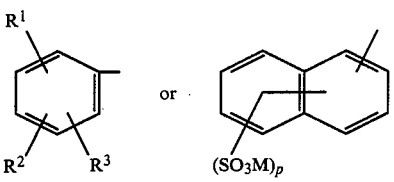

in which
R$^1$ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-(C$_1$–C$_4$-alkyl)-carbamoyl, fluorine, chlorine, bromine or trifluoromethyl,
R$^2$ is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-(C$_1$–C$_4$-alkyl)-carbamoyl, fluorine, chlorine, nitro, sulfamoyl, N-(C$_1$–C$_4$-alkyl)-sulfamoyl alkylsulfonyl having 1 to 4 carbon atoms, phenylsulfonyl or phenoxy,
R$^3$ is a hydrogen atom, a sulfo group, a β-sulfoethylsulfonyl group or a vinylsulfonyl group,
p denotes the number zero, 1, 2 or 3, and
M denotes a hydrogen atom or an alkali metal.

5. A compound as claimed in claim 3, wherein n represents the number 1 and Z is bonded to D, and D denotes a phenylene radical of the formula

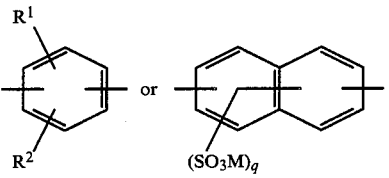

in which
R$^1$ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-(C$_1$–C$_4$-alkyl)-carbamoyl, fluorine, chlorine, bromine or trifluoromethyl,
R$^2$ is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-(C$_1$–C$_4$-alkyl)-carbamoyl, fluorine, chlorine, nitro, sulfamoyl, N-(C$_1$–C$_4$-alkyl)-sulfamoyl, alkylsulfonyl having 1 to 4 carbon atoms, phenylsulfonyl or phenoxy,
q denotes the number zero, 1 or 2, and M is a hydrogen atom or an alkali metal.

6. A compound as claimed in claim 3, wherein n represents the number 1, Z is bonded to D and K denotes a radical of the formula

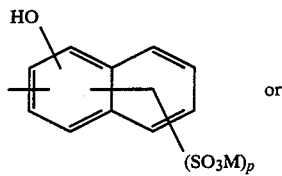

or

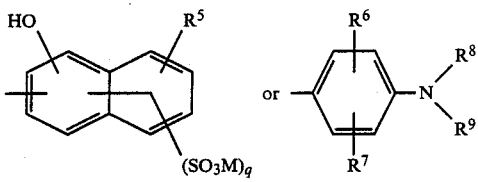

in which

R$^5$ denotes alkylureido containing alkyl groups having 1 to 6 carbon atoms, phenylureido, phenylureido which is substituted in the phenyl radical by chlorine, methyl, methoxy, nitro, sulfo and/or carboxy, alkanoylamino having 2 to 7 carbon atoms, cyclohexanoylamino, benzoylamino, or benzoylamino which is substituted in the benzene radical by chlorine, methyl, methoxy, nitro, sulfo and/or carboxy, R$^6$ is hydrogen, alkyl having 1 to 4 carbon atoms, alkoxy having 1 to 4 carbon atoms, bromine, chlorine or alkanoylamino having 2 to 7 carbon atoms, R$^7$ is hydrogen, alkyl having 1 to 4 carbon atoms, alkoxy having 1 to 4 carbon atoms, chlorine or alkanoylamino having 2 to 7 carbon atoms, or a ureido or phenylureido group, R$^8$ is hydrogen, or alkyl which has 1 to 4 carbon atoms and which may be substituted by hydroxy, cyano, carboxy, sulfo, sulfato, methoxycarbonyl, ethoxycarbonyl or acetoxy, R$^9$ represents alkyl which has 1 to 4 carbon atoms and which may be substituted by hydroxy, cyano, carboxy, sulfo, sulfato, methoxycarbonyl, ethoxycarbonyl or acetoxy, or is benzyl or phenyl or phenyl which is substituted by alkyl having 1 to 4 carbon atoms, alkoxy having 1 to 4 carbon atoms, chlorine and/or sulfo, p represents the number zero, 1, 2 or 3, q denotes the number zero, 1 , or 2, and M is a hydrogen atom or an alkali metal.

7. A compound as claimed in claim 3, wherein n represents the number 1, the radical Z is bonded to K, and the -K-Z group denotes a radical of the formula

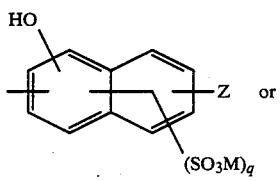

-continued

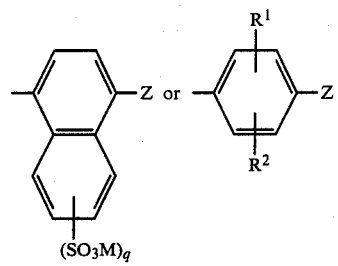

in which R$^1$ equals hydrogen, methyl, methoxy, chlorine, carboxy or sulfo, R$^2$ equals hydrogen, methyl, methoxy, chlorine, carboxy, sulfo or acetylamino, q is the number zero, 1 or 2, and M equals hydrogen or an alkali metal, and Z has the meaning mentioned in claim 3.

8. A compound as claimed in claim 3, wherein v represents the number 1 and E denotes a radical of the formula

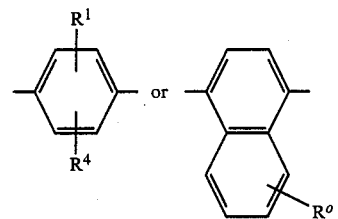

in which

R$^4$ is hydrogen, alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, phenylsulfonyl or alkylsulfonyl having 1 to 4 carbon atoms 9. A compound as claimed in claim 1, corresponding to the formula (15)

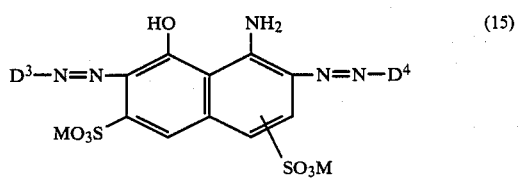

(15)

in which D$^3$ and D$^4$ have meanings which are identical to or different from one another, and each is the radical of a diazo component of which at least one contains, bonded, a fiber-reactive group of the formula (3) where R in each case equals a hydrogen atom, and in which M denotes a hydrogen atom or an alkali metal.

10. A compound as claimed in claim 9, wherein D$^3$ or D$^4$ or both, identical to or different from one another, denote a radical of the formula (10a) or (10b) or (12), at least one of the radicals D$^3$ and D$^4$ being a radical of the formula (12)

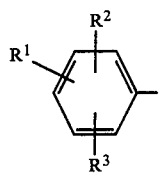
(10a)

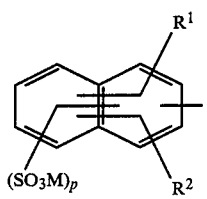
(10b)

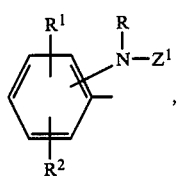
(12)

in which
$R^1$ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-($C_1$-$C_4$-alkyl)-carbamoyl, fluorine, chlorine, bromine or trifluoromethyl, $R^2$ is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-($C_1$-$C_4$-alkyl)-carbamoyl, fluorine, chlorine, nitro, sulfamoyl, N-($C_1$-$C_4$-alkyl)-sulfamoyl alkylsulfonyl having 1 to 4 carbon atoms, phenylsulfonyl or phenoxy, $R^3$ is hydrogen, sulfo, β-sulfatoethylsulfonyl or vinylsulfonyl, R is hydrogen, $Z^1$ represents a radical of the formula (3a)

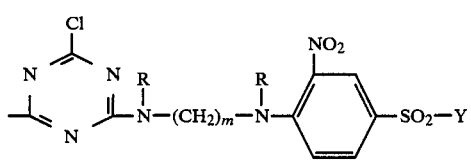
(3a)

where R in each case is hydrogen, and m and Y have the meaning given in claim 1,
p denotes the number zero, 1, 2 or 3 and
M is a hydrogen atom or an alkali metal.

11. A compound as claimed in claim 1, corresponding to the formula

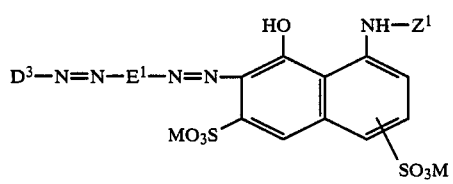

in which
$D^3$ is a radical of the formula (10a) or (10b)

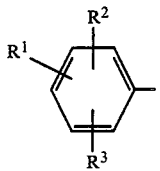
(10a)

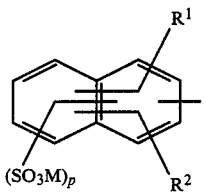
(10b)

in which
$R^1$ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-($C_1$-$C_4$-alkyl)-carbamoyl, fluorine, chlorine, bromine or trifluoromethyl, $R^2$ is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-($C_1$-$C_4$-alkyl)-carbamoyl, fluorine, chlorine, nitro, sulfamoyl, N-($C_1$-$C_4$-alkyl)-sulfamoyl, alkylsulfonyl having 1 to 4 carbon atoms, phenylsulfonyl or phenoxy, $R^3$ denotes hydrogen, sulfo, β-sulfatoethylsulfonyl or vinylsulfonyl, p denotes the number zero, 1, 2 or 3, and
M is a hydrogen atom or an alkali metal,
$E^1$ is a radical of the formula

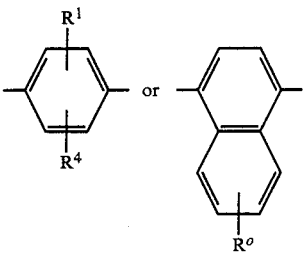

in which
$R^1$ has one of the abovementioned meanings, and
$R^4$ is hydrogen alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, phenylsulfonyl, cycloalkylureido having 5 to 8 carbon atoms in the cycloalkyl part, alkylsulfonyl having 1 to 4 carbon atoms or alkylsulfonylamino having 1 to 4 carbon atoms, and
$R^0$ represents hydrogen or sulfo, and
$Z^1$ represents a radical of the formula (3a)

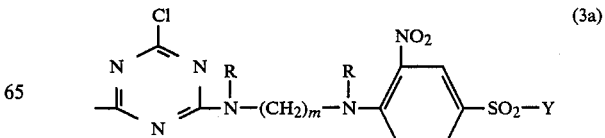
(3a)

where R in each case is hydrogen and m and Y have the meaning given in claim 1.

12. A compound as claimed in claim 1, of the formula

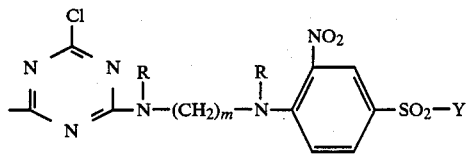

in which
D³ is a radical of the formula

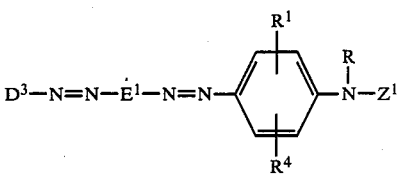

in which
R¹ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-($C_1$-$C_4$-alkyl)-carbamoyl, fluorine, chlorine, bromine or trifluoromethyl, R² is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-($C_1$-$C_4$alkyl)-carbamoyl, fluorine, chlorine, nitro, sulfamoyl, N-($C_1$-$C_4$-alkyl)-sulfamoyl, alkylsulfonyl having 1 to 4 carbon atoms, phenylsulfonyl or phenoxy, R³ denotes hydrogen, sulfo, β-sulfatoethylsulfonyl or vinylsulfonyl, p denotes the number zero, 1, 2 or 3, and
M is a hydrogen atom or an alkali metal,
R represents a hydrogen atom,
q is the number zero, 1 or 2, and
E¹ is a radical of the formula

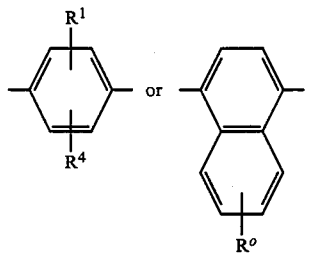

in which
R¹ has one of the abovementioned meanings, and
R⁴ is hydrogen, alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, phenylsulfonyl, cycloalkylureido having 5 to 8 carbon atoms in the cycloalkyl part, alkylsulfonyl having 1 to 4 carbon atoms or alkylsulfonylamino having 1 to 4 carbon atoms, and R₀ represents hydrogen or sulfo, and
Z¹ represents a radical of the formula (3a)

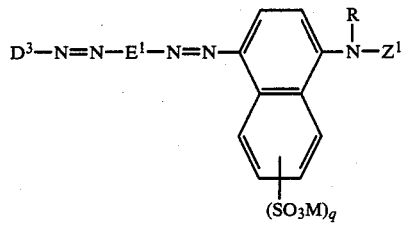

where R in each case is hydrogen and m and Y have the meaning given in claim 1.

13. A compound as claimed in claim 1, of the formula

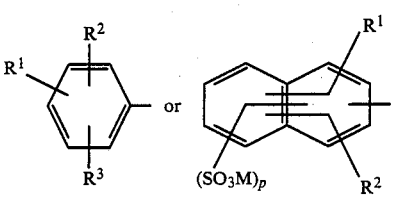

in which
D³ is a radical of the formula

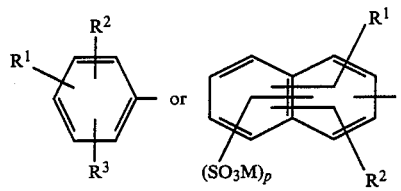

in which
R¹ is hydrogen, methyl, ethyl, methoxy, ethoxy, alkanoyl having 2 to 5 carbon atoms, cyano, carboxy, sulfo, alkoxycarbonyl having 2 to 5 carbon atoms, carbamoyl, N-($C_1$-$C_4$-alkyl)-carbamoyl, fluorine, chlorine, bromine or trifluoromethyl, R² is hydrogen, methyl, ethyl, methoxy, ethoxy, cyano, carboxy, sulfo, alkanoylamino having 2 to 5 carbon atoms, alkoxycarbonyl having 2 to 5 carbon atoms, carbamoyl, N-($C_1$-$C_4$-alkyl)-carbamoyl, fluorine, chlorine, nitro, sulfamoyl, N-($C_1$-$C_4$-alkyl)-sulfamoyl, alkylsulfonyl having 1 to 4 carbon atoms, phenylsulfonyl or phenoxy, R³ denotes hydrogen, sulfo, β-sulfatoethylsulfonyl or vinylsulfonyl, p denotes the number zero, 1, 2 or 3 and
M is a hydrogen atom or an alkali metal,
R represents a hydrogen atom, and
E¹ is a radical of the formula

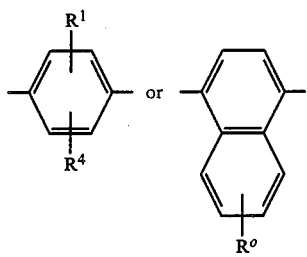

in which
R¹ has one of the abovementioned meanings, and
R⁴ is hydrogen, alkyl having 1 to 4 carbon atoms, alkoxy having 1 to 4 carbon atoms, chlorine, alkanoylamino having 2 to 5 carbon atoms, benzoylamino, ureido, phenylureido, alkylureido having 1 to 4 carbon atoms in the alkyl radical, phenylsulfonyl, cycloalkylureido having 5 to 8 carbon atoms in the cycloalkyl part, alkylsulfonyl having 1 to 4 carbon atoms or alkylsulfonylamino having 1 to 4 carbon atoms, and
R⁰ represents hydrogen or sulfo, and
Z¹ represents a radical of the formula (3a)

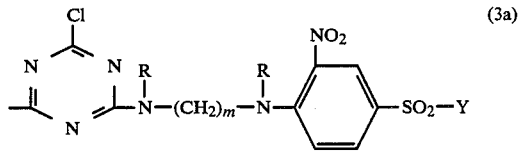

(3a)

where R in each case is hydrogen and m and Y have the meaning given in claim 1.

14. A compound as claimed in claim 1, wherein m is the number 2.

15. A compound as claimed in claim 1, wherein Y represents the β-sulfatoethyl group.

16. A compound as claimed in claim 1, wherein each R represents a hydrogen atom.

* * * * *

UNITED STATES PATENT AND TRADEMARK OFFICE
CERTIFICATE OF CORRECTION

PATENT NO.   : 4,873,320
DATED        : October 10, 1989
INVENTOR(S)  : Hartmut Springer, Manfred Kuhn, Holger M. Buch It is certified that error appears in the above-identified patent and that said Letters Patent is hereby corrected as shown below:

In claim 3, column 39, line 32, the formula should read:

$$Z_n \left[ D - N = N \cdot ( E - N = N )_v \quad K \right] \quad (4)$$

In column 39, line 67, "V" should read --v--.

In column 46, line 3, "R$_0$" should read --R$^O$--.

Signed and Sealed this

Twelfth Day of March, 1991

*Attest:*

HARRY F. MANBECK, JR.

*Attesting Officer*      *Commissioner of Patents and Trademarks*